(12) United States Patent
Lam et al.

(10) Patent No.: US 8,619,415 B1
(45) Date of Patent: Dec. 31, 2013

(54) ROTATABLE AND EXTENDABLE DISPLAY PORTION OF A COMPUTING DEVICE

(75) Inventors: Lawrence Lam, San Jose, CA (US); Gadi Amit, San Francisco, CA (US)

(73) Assignee: Google Inc., Mountain View, CA (US)

( * ) Notice: Subject to any disclaimer, the term of this patent is extended or adjusted under 35 U.S.C. 154(b) by 306 days.

(21) Appl. No.: 13/077,118

(22) Filed: Mar. 31, 2011

(51) Int. Cl.
*G06F 1/16* (2006.01)

(52) U.S. Cl.
USPC ............ 361/679.26; 361/679.05; 361/679.27; 312/223.1; 312/223.2; 248/917; 248/918

(58) Field of Classification Search
USPC ..................................................... 361/679.05
See application file for complete search history.

(56) References Cited

U.S. PATENT DOCUMENTS

| | | | |
|---|---|---|---|
| 5,494,447 A * | 2/1996 | Zaidan ............................. 439/31 |
| 6,532,147 B1 * | 3/2003 | Christ, Jr. ................. 361/679.27 |
| 6,816,365 B2 | 11/2004 | Hill et al. |
| 6,831,229 B1 * | 12/2004 | Maatta et al. ................... 174/66 |
| 7,092,246 B2 | 8/2006 | Tanaka et al. |
| 7,215,538 B1 | 5/2007 | Chen et al. |
| 7,353,050 B2 * | 4/2008 | Im et al. ...................... 455/575.3 |
| 7,565,720 B1 * | 7/2009 | Ligtenberg et al. ............. 16/366 |
| 7,646,593 B2 | 1/2010 | Smejkalova |
| 7,679,890 B2 | 3/2010 | Yang |
| 7,821,780 B2 | 10/2010 | Choy |
| 8,068,334 B2 * | 11/2011 | Tang ......................... 361/679.27 |
| 8,295,652 B1 * | 10/2012 | Newstead ...................... 382/311 |
| 8,300,394 B2 * | 10/2012 | Senatori .................... 361/679.27 |
| 8,315,042 B2 * | 11/2012 | Fang et al. ................ 361/679.01 |
| 8,320,123 B2 * | 11/2012 | Chen .......................... 361/679.59 |
| 8,416,561 B2 * | 4/2013 | Hamada .................... 361/679.27 |
| 2002/0044411 A1 * | 4/2002 | Iredale ............................ 361/683 |
| 2003/0007322 A1 * | 1/2003 | Amemiya et al. ............. 361/683 |
| 2003/0103324 A1 * | 6/2003 | Gallivan ........................ 361/681 |
| 2006/0256512 A1 * | 11/2006 | Esther Kang ................. 361/681 |
| 2008/0024388 A1 | 1/2008 | Bruce |

* cited by examiner

*Primary Examiner* — Anthony Q Edwards
(74) *Attorney, Agent, or Firm* — Brake Hughes Bellermann LLP

(57) ABSTRACT

In one general aspect a computing device can include a base portion including an input region, a display portion, and a rotating mechanism fixedly coupled to the display portion. The computing device can include a connecting rod coupled to the rotating mechanism and to the base portion. The rotating mechanism and connecting rod can be configured to move a bottom portion of the display portion in a direction away from the input region in response to the display portion being rotated about an axis of the rotating mechanism from a closed position with respect to the base portion toward a flat position with respect to the base portion.

23 Claims, 13 Drawing Sheets

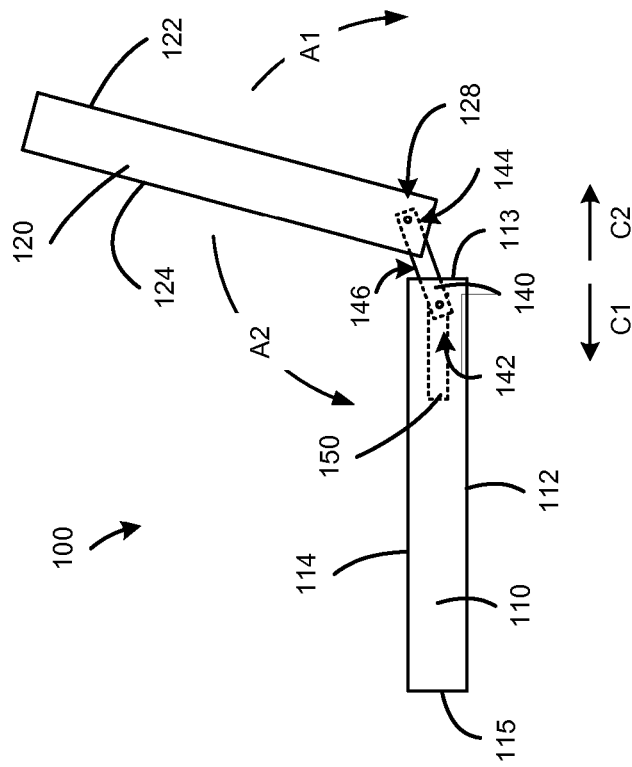
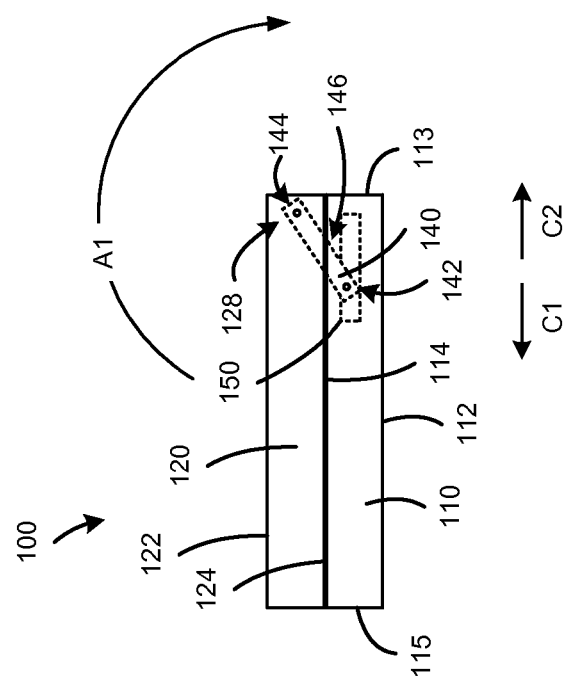

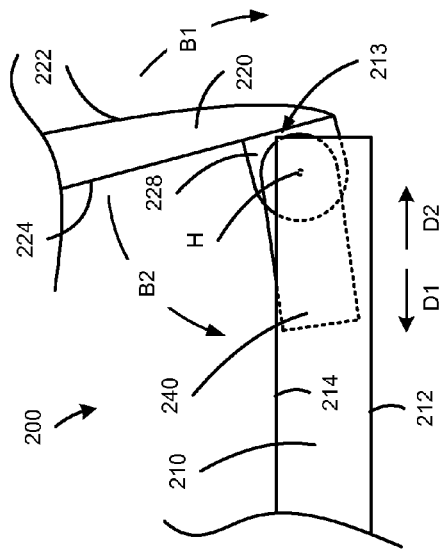
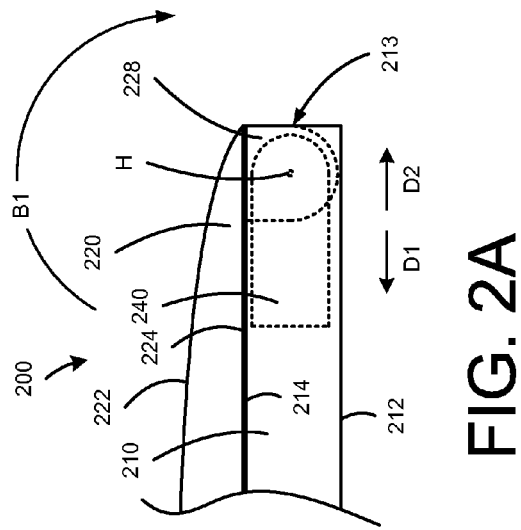
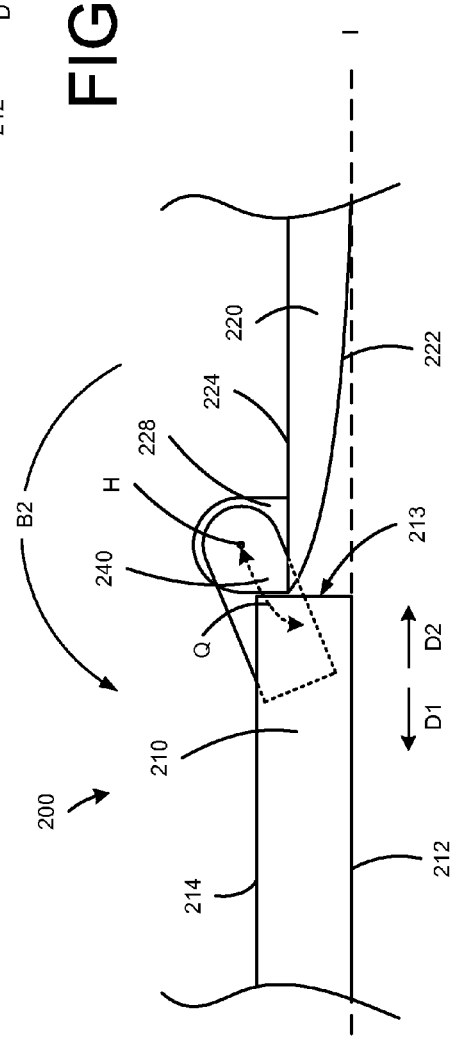

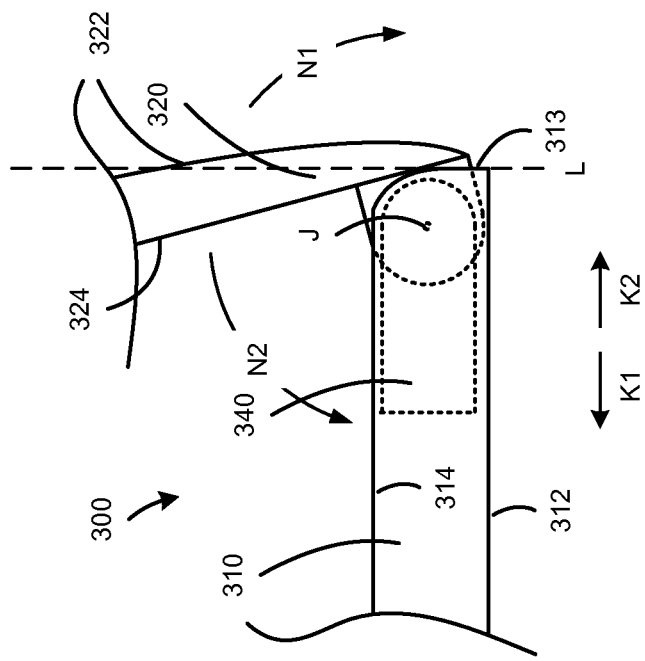
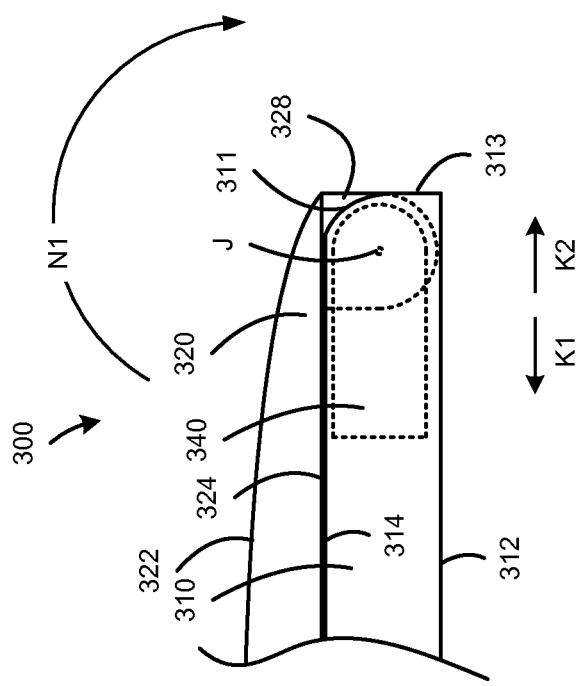
FIG. 3B
FIG. 3A

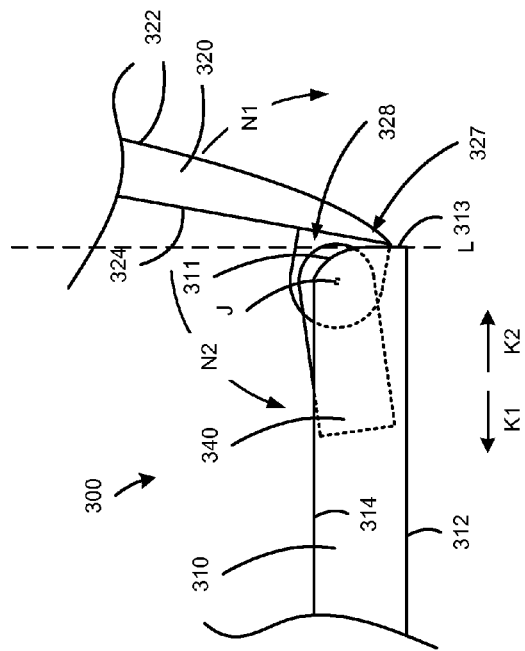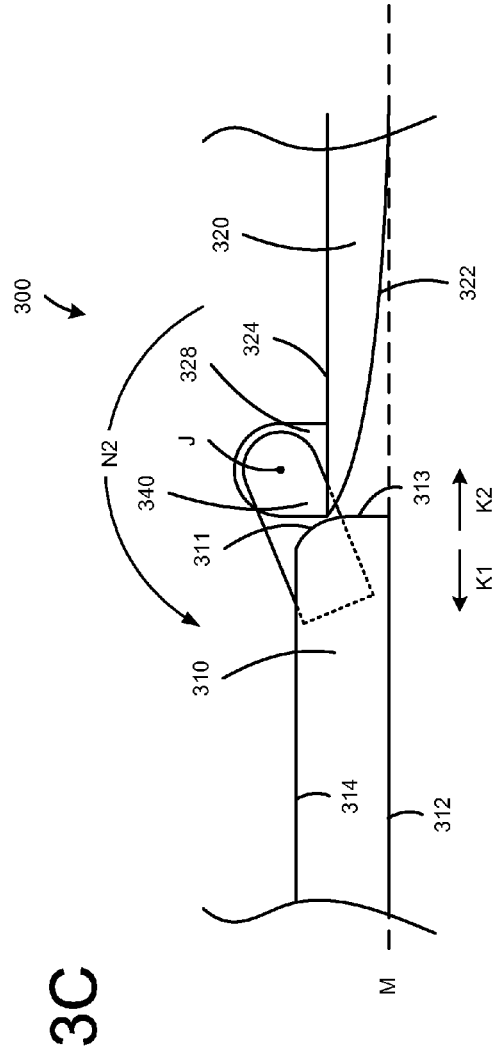

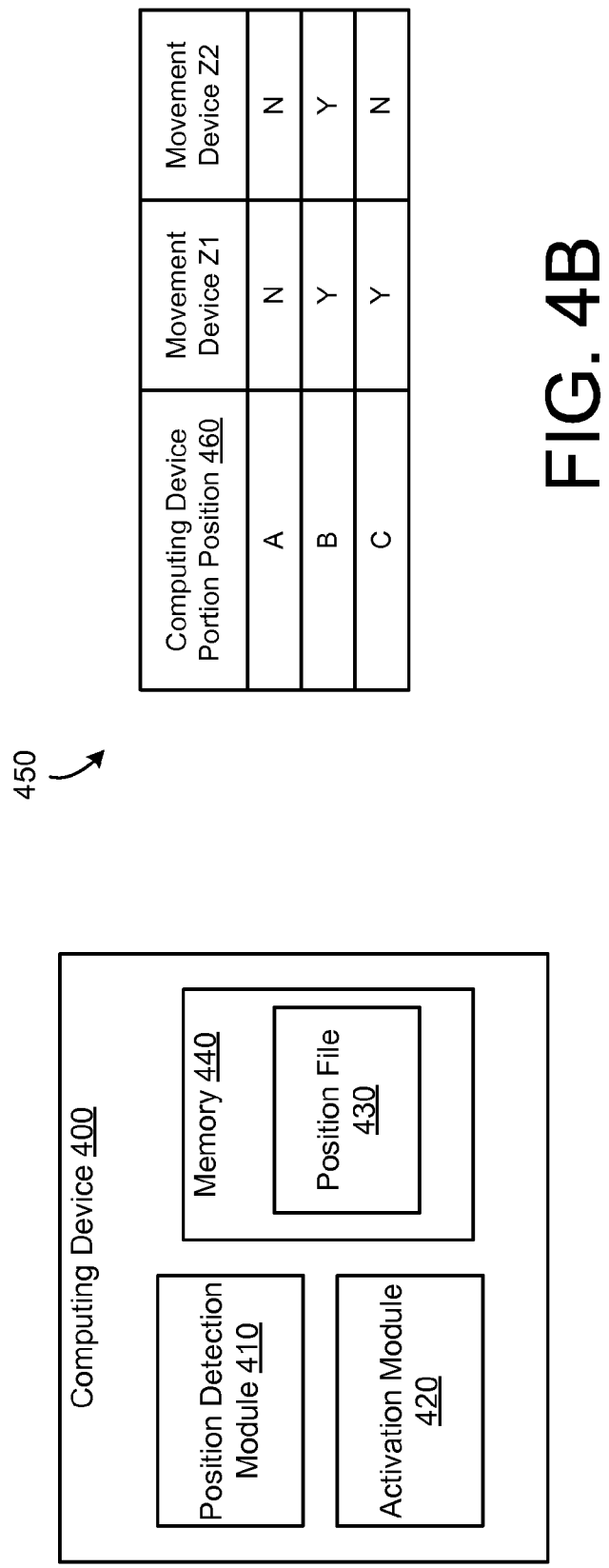

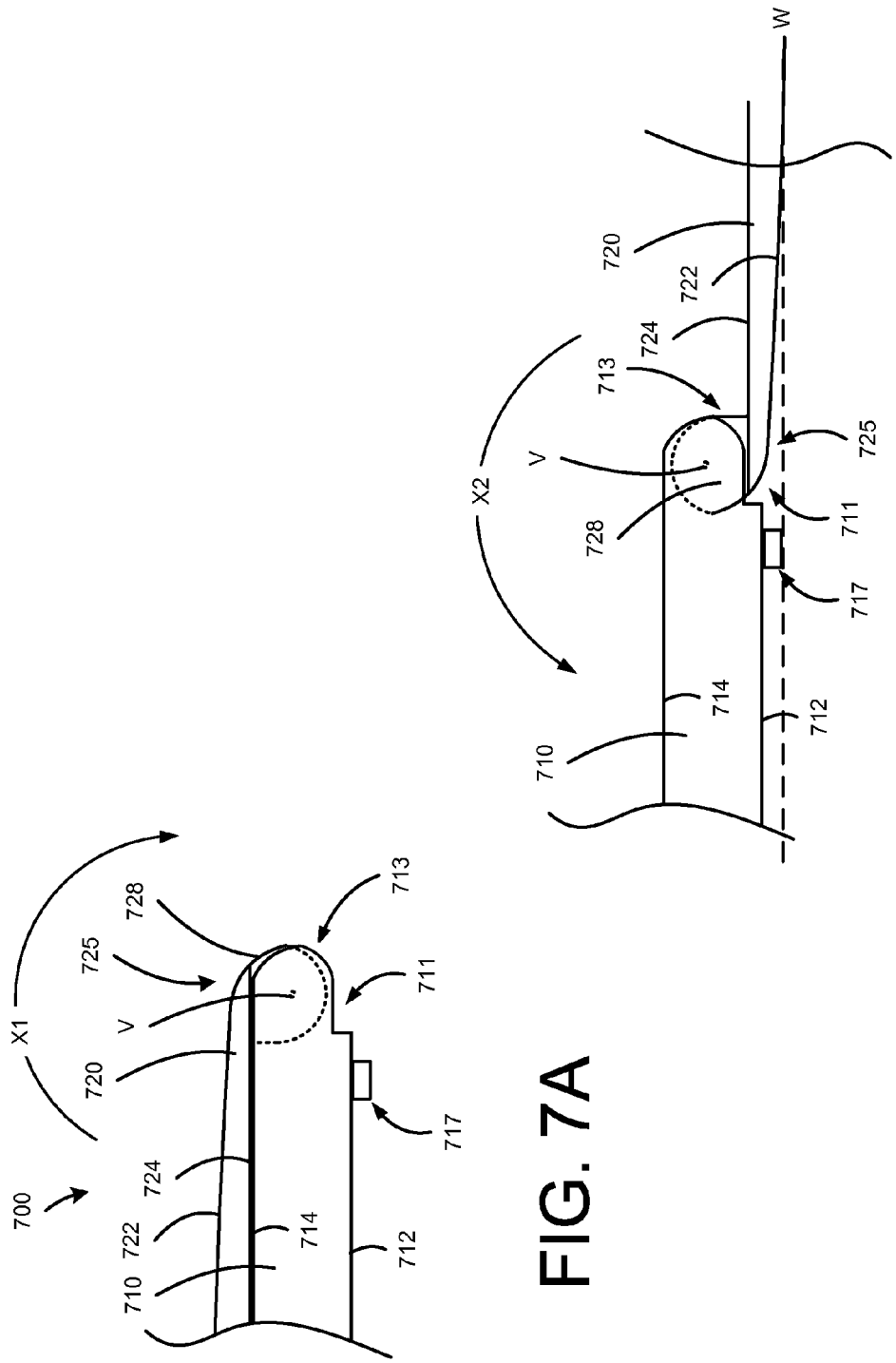

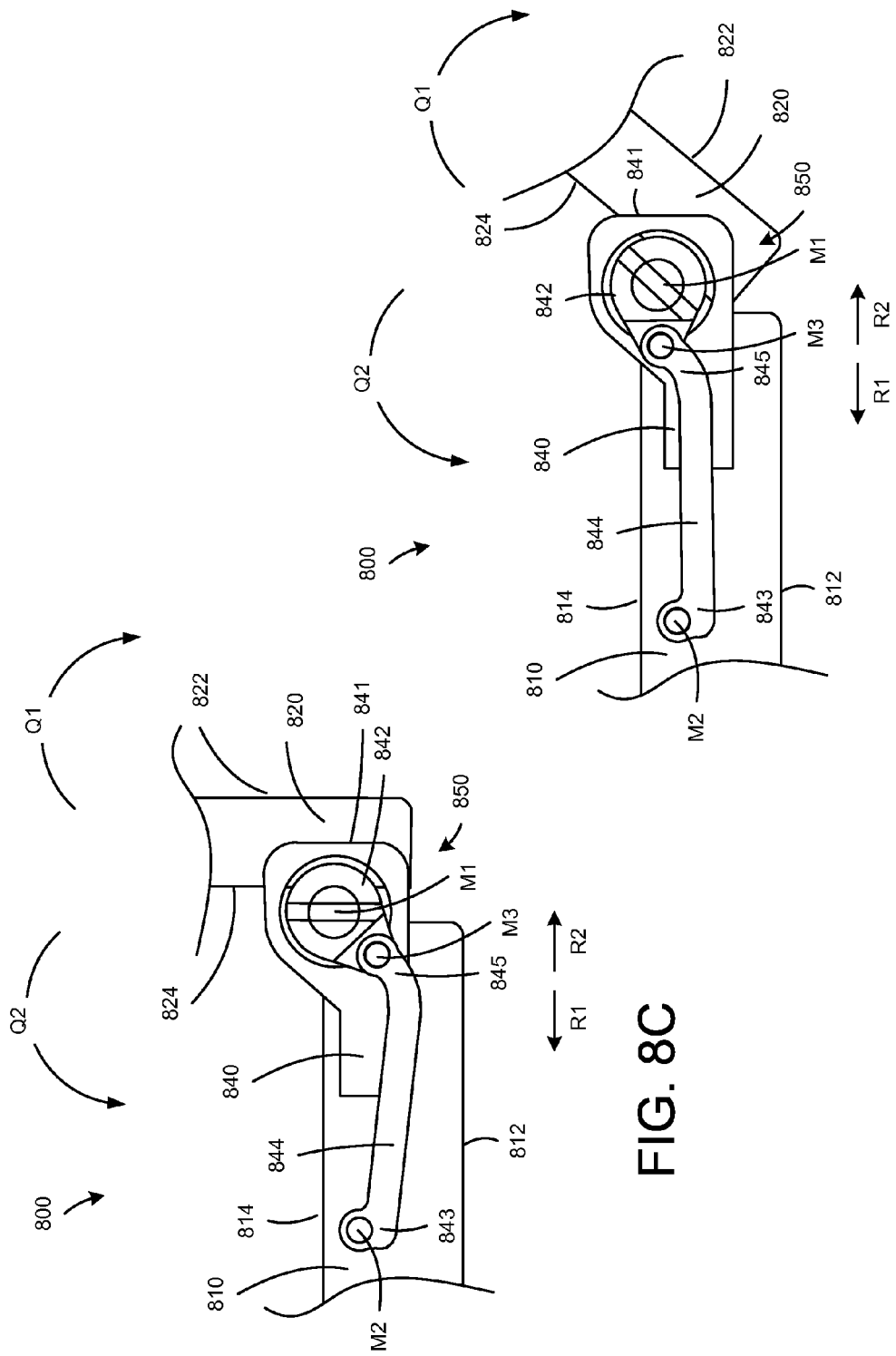

ROTATABLE AND EXTENDABLE DISPLAY PORTION OF A COMPUTING DEVICE

TECHNICAL FIELD

This description relates to a moveable display portion of a computing device.

BACKGROUND

Many known computing devices can have several mechanisms through which a user may interact with (e.g., trigger) one or more functions of the computing device. For example, user input devices such as keyboards, mouse devices, touch screen displays and/or so forth, through which a user may interact with computing devices to perform one or more computing functions, can be connected with and/or integrated into the computing devices. However, these user input devices may be cumbersome to use and/or may not produce results at a desirable speed, level of accuracy, and/or with a desired effect. Thus, a need exists for systems, methods, and apparatus to address the shortfalls of present technology and to provide other new and innovative features.

SUMMARY

In one general aspect a computing device can include a base portion including an input region, a display portion, and a rotating mechanism fixedly coupled to the display portion. The computing device can include a connecting rod coupled to the rotating mechanism and to the base portion. The rotating mechanism and connecting rod can be configured to move a bottom portion of the display portion in a direction away from the input region in response to the display portion being rotated about an axis of the rotating mechanism from a closed position with respect to the base portion toward a flat position with respect to the base portion.

In another general aspect a computing device can include a base portion including an input region, a display portion configured to rotate about an axis, and an extension member coupled to the base portion and coupled to the display portion. The extension member can include a portion configured to translate in a direction orthogonal to the axis in response to the display portion being rotated about the axis. The computing device can include a rotating mechanism rotatably coupled to the extension member and configured to function as a cam.

In yet another general aspect a computing device can include a base portion including an input region, and a display portion operably coupled to the base portion via a gear mechanism. The display portion can be configured to rotate about an axis. The gear mechanism can be configured to cause the axis to translate with respect to the input region as the display portion is rotated about the axis from a first open position to a second open position.

The details of one or more implementations are set forth in the accompanying drawings and the description below. Other features will be apparent from the description and drawings, and from the claims.

BRIEF DESCRIPTION OF THE DRAWINGS

FIG. 1A is a schematic diagram of a side view of computing device in a closed configuration.

FIG. 1B is a schematic diagram of a side view of the computing device shown in FIG. 1A in an open configuration.

FIG. 2A is a diagram of a side view of a portion of a computing device, including a base portion and a display portion, in a closed configuration.

FIG. 2B is a diagram of a side view the portion of the computing device shown in FIG. 2A in an open configuration.

FIG. 2C is a diagram of a side view of the portion of the computing device shown in FIGS. 2A and 2B in a flat configuration.

FIG. 3A is a diagram of a side view of a portion of a computing device, including a base portion and a display portion, in a closed configuration.

FIGS. 3B and 3C are diagrams of side views of the portion of the computing device shown in FIG. 3A in an open configuration.

FIG. 3D is a diagram of a side view of the portion of the computing device shown in FIGS. 3A through 3C in a flat configuration.

FIG. 4A is a block diagram that illustrates a position detection module and an activation module of a computing device.

FIG. 4B illustrates a position file that can be stored in the memory of the computing device shown in FIG. 4A.

FIG. 7A is another diagram of a side view of a portion of a computing device, including a base portion and a display portion, in a closed configuration.

FIG. 7B is a schematic diagram of a side view of the portion of the computing device shown in FIG. 7A in a flat configuration.

FIGS. 8B through 8D are diagrams of side views of the portion of the computing device shown in FIG. 8A in an open configuration.

DETAILED DESCRIPTION

Figure 1C:
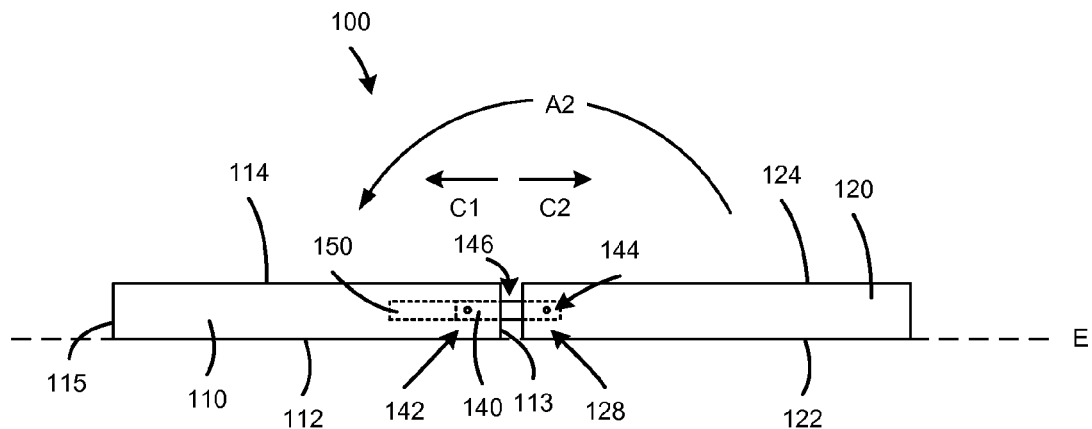
FIG. 1C is a schematic diagram of a side view of the computing device shown in FIGS. 1A and 1B in a flat configuration.
Figure 1D:
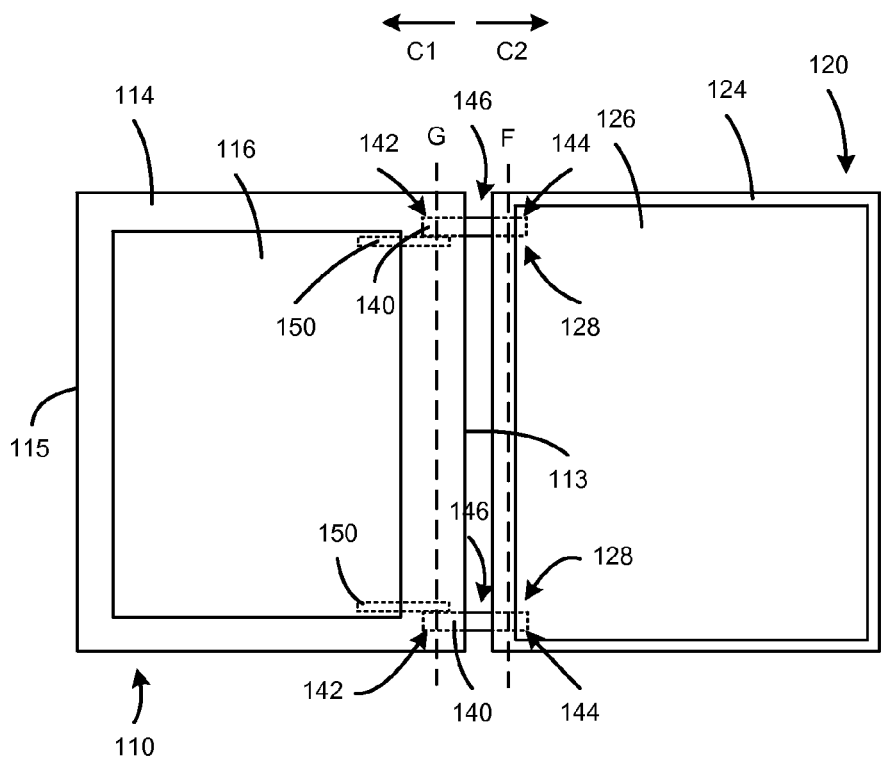
FIG. 1D is a schematic diagram of a top view of the computing device shown in FIG. 1C.

FIGS. 1A through 1D are schematic diagrams of a computing device 100 in various configurations. Specifically, FIG. 1A is a schematic diagram of a side view of computing device 100 in a closed configuration. FIG. 1B is a schematic diagram of a side view of the computing device 100 shown in FIG. 1A in an open configuration, and FIG. 1C is a schematic diagram of a side view of the computing device 100 shown in FIGS. 1A and 1B in a flat configuration. FIG. 1D is a schematic diagram of a top view of the computing device 100 shown in FIG. 1C.

As shown in FIGS. 1A through 1D, the computing device 100 has a base portion 110 and a display portion 120. The display portion 120 has an outer surface 122 that defines at least a portion of an outer cover of the computing device 100 when the computing device is in the closed configuration. The base portion 110 has a bottom surface 112 and a top surface 114.

As shown in FIG. 1D, the base portion 110 can include an input region 116. The input region 116 can include various types of input devices such as, for example, a keyboard, one or more buttons, an electrostatic touchpad to control a mouse cursor, etc. The input region 116 may be accessible by a user at or via the top surface 114 of the base portion 110.

Also, as shown in FIG. 1D, the display portion 120 can include a display 126. The display 126 can have a display surface (also can be referred to as a viewable surface) upon which illuminated objects can be displayed and viewed by a user. In some embodiments, the display surface of the display 126 can define at least a portion of a surface 124 of the display portion 120.

In some embodiments, the display 126 included in the display portion 120 can be, for example, a touch sensitive display. In some embodiments, the display 126 can be, or can include, for example, an electrostatic touch device, a resistive touchscreen device, a surface acoustic wave (SAW) device, a capacitive touchscreen device, a pressure sensitive device, a surface capacitive device, a projected capacitive touch (PCT) device, and/or so forth. If a touch sensitive device, the display 126 can function as an input device. For example, the display 126 can be configured to display a virtual keyboard (e.g., emulate a keyboard) that can be used by a user as an input device.

As illustrated by FIGS. 1A through 1D, the computing device 100 is configured to change between various configurations. When the computing device 100 is in the closed configuration shown in FIG. 1A, the surface 124 of the display portion 120 faces the top surface 114 of the base portion 110. When the computing device 100 is in the closed configuration, the display portion 120 can be referred to as being in a closed position with respect to the base portion 110. The display 126 of the display portion 120 of the computing device 100 faces (and may cover) the input region 116 of the base portion 110 of the computing device 100 when the computing device 100 is in the closed configuration. When in the closed configuration, the surface 124 of the display portion 120 (or the display surface of the display 126) can be aligned along a plane that is substantially parallel to a plane along which the bottom surface 112 and/or the top surface 114 of the base portion 110 is aligned.

The computing device 100 can be changed from the closed configuration shown in FIG. 1A to the open configuration shown in FIG. 1B by rotating the display portion 120 in a clockwise direction A1. The display portion 120 is configured to rotate about an axis F, which is through hinge portions 128 of the display portion 120.

When in the open configuration, the surface 124 of the display portion 120 does not directly face the top surface 114 of the base portion 110. Instead, the surface 124 of the display portion 120 (or the display surface of the display 126) is aligned along a plane that is nonparallel to a plane along which the bottom surface 112 and/or the top surface 114 of the base portion 110 is aligned. When the computing device 100 is in the open configuration, the display portion 120 can be referred to as being in an open position with respect to the base portion 110. As shown in FIG. 1B, the computing device 100 can be moved from the open configuration to the closed configuration by rotating the display portion 120 in a counterclockwise direction A2.

Although not shown in FIGS. 1A through 1D, the computing device 100 can have many open configurations, where the surface 124 of the display portion 120 is aligned along a plane that is nonparallel to a plane along which the bottom surface 112 and/or the top surface 114 of the base portion 110 is aligned. In other words, the display portion 120 can be moved between various open positions with respect to the base portion 110 where the display 126 may be viewed by, for example, a user.

The computing device 100 can be changed from the open configuration shown in FIG. 1B, to the flat configuration shown in FIG. 1C by rotating the display portion 120 in the clockwise direction A1 until the display portion 120 and the base portion 110 are aligned along (e.g., substantially aligned along) a common plane E. Specifically, the display portion 120 can be rotated in the clockwise direction A1 until the outer surface 122 of the display portion 120 is aligned along (or intersects or comes in contact with) the plane E and the bottom surface 112 of the base portion 110 is also aligned along the plane E. Thus, the base portion 110 and the display portion 120 have a flat orientation when the computing device 100 is in the flat configuration shown in FIG. 1C. When the computing device 100 is in the flat configuration, the display portion 120 can be referred to as being in a flat position with respect to the base portion 110. In some embodiments, when the computing device 100 is in the flat configuration, the display surface 124 of the display portion 120 can be aligned along a plane that is parallel to (or substantially parallel to) a plane along which the bottom surface 112 (or top surface 114) of the base portion 110 is aligned. In some embodiments, an angle between the display surface 124 of the display portion 120 and the base portion 110 (e.g., the top portion 114, the bottom portion 112) is greater than 180 degrees when the computing device 100 is in the flat configuration.

Extensions 140, which are shown in FIGS. 1A through 1D, are used to couple the base portion 110 to the display portion 120 and to enable the computing device 100 to change between the various configurations shown in FIGS. 1A through 1D. In other words, the display portion 120 is coupled to the base portion 110 via the extensions 140. As shown in FIGS. 1A through 1B, the display portion 120 has hinge portions 128 that are coupled to the base portion 110 via hinge portions 144 (also can be referred to as distal ends) of the extensions 140. The hinge portions 128 and the hinge portions 144 can collectively define at least a portion of a hinge. In some embodiments, the extensions 140 can each be referred to as extension members.

As illustrated in FIGS. 1A through 1D, the extensions 140 are configured to translate in direction C1 (towards a front end 115 and towards the input region 116 of the base portion 110) and in direction C2 (towards the back end 113 and away from the input region 116 of the base portion 110) along the guides 150 disposed within the base portion 110. Translation in direction C2 can be referred to as projection of the extensions 140 (out of the base portion 110 and away from the input region 116), and translation in direction C1 can be referred to as retraction of the extensions 140 (into the base portion 110 and towards the input region 116). In some embodiments, the extensions 140 are coupled to the base portion 110 via the guides 150.

In some embodiments, the direction C1 can be referred to as translational directions C1, and direction C2 can be referred to as translational direction C2. As shown in FIG. 1D, the translational directions C1 and C2 are orthogonal to (or substantially orthogonal to) the axis G and the axis F. Also, the axis G and the axis F can each be orthogonal to an axis (e.g., a longitudinal axis) of (or line aligned along) one or more of the guides 150.

Also, as illustrated in FIGS. 1A through 1B, the extensions 140 are configured to rotate in the clockwise direction A1 and in the counterclockwise direction A2. Thus, the extensions 140 are configured to rotate, as well as translate, in response to the computing device 100 being moved between the configurations illustrated in FIGS. 1A through 1D. The extensions 140 are configured to rotate about an axis G (shown in FIG. 1B).

Specifically, in response to the computing device 100 being moved from the closed configuration shown in FIG. 1A to the open configuration shown in FIG. 1B, the extensions 140 are configured to slidably move (e.g., translate) within the guides 150 along direction C2 and rotate in the clockwise direction A1. The extensions 140 have proximal ends 142 configured to slidably move within the guides 150. In some embodiments, the proximal ends 142 can be referred to as hinge portions of the extensions 140.

In this embodiment, in response to the display portion 120 being moved from the closed position shown in FIG. 1A to the open position shown in FIG. 1B, the extensions 140 are configured to slidably move and rotate. In some embodiments, in response to the computing device 100 being moved from the open configuration shown in FIG. 1B to the closed configuration shown in FIG. 1A, the extensions 140 can be configured to slidably move (e.g., translate) within the guides 150 along direction C1 and rotate in the counterclockwise direction A2. Also, in response to the display portion 120 being moved from the closed position shown in FIG. 1A to the open position shown in FIG. 1B, the axis F is configured to move away from the input region 116 of the base portion 110.

As shown in FIG. 1A, one or more portions of medial portions 146 of the extensions 140 are disposed within the base portion 110 and/or the display portion 120 of the computing device 100 when the computing device 100 is in the closed configuration. In response to the computing device 100 being moved to the open configuration and/or the flat configuration, the portion(s) of the medial portions 146 of the extensions 140 are moved from positions disposed within the base portion 110 and/or the display portion 120 to positions outside of the base portion 110 and/or the display portion 120. Thus, the portion(s) of the medial portions 146 are moved out of (e.g., translated out of) the base portion 110 and/or the display portion 120 (and are exposed) in response to the computing device being moved from the closed configuration to the open configuration and/or the flat configuration.

In response to the computing device 100 being moved from the open configuration shown in FIG. 1B to the flat configuration shown in FIG. 1C, the extensions 140 are configured to rotate in the clockwise direction A1. In this embodiment, the extensions 140 do not translate in direction C1 or direction C2 in response to the computing device 100 being moved from the open configuration to the flat configuration because the extensions 140 are fully translated within the guides 150 out of the back end 113 of the base portion 110 when in the open configuration shown in FIG. 1B. In some embodiments, the extensions 140 and/or guides 150 may be configured so that the extensions 140 slidably move (e.g., translate) in response to the computing device 100 being moved from the open configuration to the flat configuration.

In some embodiments, one or more of the guides 150 can be, or can include, a slot or groove into which the sliding portions (not shown) of the guides 150 can be inserted and slidably moved. In some embodiments, one or more of the guides 150 can include a member (e.g., a rod) along which one or more of the sliding portions of the guides 150 can slidably move. In some embodiments, at least a portion of one or more of the sliding portions of the guides 150 can be disposed around (e.g., at least partially around), or otherwise coupled to, the member. In some embodiments, one or more of the sliding portions of the guides 150 and/or one or more of the guides 150 can include rolling devices such as wheels or ball-bearings that can facilitate translational movement (e.g., facilitate relatively smooth translational movement) of the display portion 120 with respect to the base portion 110. In some embodiments, one or more input devices (e.g., a keyboard) included in the input region 116 can have a fixed position in the base portion 110 with respect to one or more of the guides 150.

In some embodiments, the extensions 140 can be configured to translate and/or rotate only within a portion of a range of rotation of the display portion 120 in the clockwise direction A1 or the counterclockwise direction A2. For example, in some embodiments, the extensions 140 may not be configured to translate (e.g., translation in direction C1 or C2) and/or rotate (e.g., rotate in the clockwise direction A1 or the counterclockwise direction A2) when an angle between the surface 124 of the display portion 120 and the top surface 114 of the base portion 110 is less than a specified angle (e.g., 30 degrees, 60 degrees, 90 degrees, 120 degrees, 150 degrees), and the extension 140 is configured to translate and/or rotate when the angle between the surface 124 of the display portion 120 and the top surface 114 of the base portion 110 is greater than or equal to the specified angle. More details related to translation and/or rotation of extensions within only a portion of a range of rotation of a display portion are discussed in connection with the figures below.

Although not shown, in some embodiments, the base portion 110 can include various computing components such as one or more processors, a graphics processor, a motherboard, a memory (e.g., a disk drive, a solid-state drive), and/or so forth. One or more images displayed on a display of the display portion 120 can be triggered by the computing components included in the base portion 110. In some embodiments, one or more wires configured to handle signaling (e.g., video signals, signals generated in response to interactions with the display) between the display portion 120 and the base portion 110 can be associated with one or more of the extensions 140 and/or guides 150. For example, one or more wires configured to transfer signals between the base portion 110 (e.g., a processor included in the base portion 110) and the display portion 120 can be disposed inside of one or more of the extensions 140 and/or guides 150.

In some embodiments, one or more detents can be included along (or in) one or more of the extensions 140 and/or guides 150. In some embodiments, the movement of the extensions 140 can be dampened by one or more dampeners (not shown) (e.g., friction components, resistive elements, torsion bar). In other words, the extensions 140 (and/or portions associated with the extensions 140 (e.g., the guides 150)) can be configured so that the extensions 140 move from (e.g., extends out of) the base portion 110 at a specified rate.

As shown in FIGS. 1A through 1D, the computing device 100 can be a personal computing laptop-type device. In some embodiments, the computing device 100 can be any type of computing device. The computing device 100 can be, for example, a wired device and/or a wireless device (e.g., wi-fi enabled device) and can be, for example, a computing entity (e.g., a personal computing device), a server device (e.g., a web server), a mobile phone, a personal digital assistant (PDA), and/or so forth. The computing device 100 can be configured to operate based on one or more platforms (e.g., one or more similar or different platforms) that can include one or more types of hardware, software, firmware, operating systems, runtime libraries, and/or so forth. More details related to various configurations of a computing device that has a display portion configured to move with respect to a base portion are described in connection with the figures below.

In some embodiments, the computing device 100 can be made of any type of material. For example, the extensions 140, the base portion 110, the display portion can be made of a plastic material, a metallic material, a composite material, and/or so forth.

Although illustrated in FIGS. 1A and 1D as being disposed within the base portion 110 and/or the display portion 120, in some embodiments, one or more of the extensions 140 and/or guides 150 may be disposed outside of the base portion 110 and/or the display portion 120. For example, one or more of the guides 150 may be coupled to one or more sides of the base portion 110. In such embodiments, one or more of the extensions 140 may be configured to slidably move along the one or more guides 150 coupled to the one or more sides of the base portion 110.

FIGS. 2A through 2C are diagrams that illustrate a computing device 200 in various configurations. The computing device 200 can be similar to the computing device 100 shown in FIG. 1. Specifically, FIG. 2A is a diagram of a side view of a portion of a computing device 200, including a base portion 210 and a display portion 220, in a closed configuration. FIG. 2B is a diagram of a side view the portion of the computing device 200 shown in FIG. 2A in an open configuration, and FIG. 2C is a diagram of a side view of the portion of the computing device 200 shown in FIGS. 2A and 2B in a flat configuration.

As shown in FIGS. 2A through 2C, the display portion 220 has an outer surface 222 that defines at least a portion of an outer cover of the computing device 200 when the computing device is in the closed configuration. The base portion 210 has a bottom surface 212 and a top surface 214.

Although not shown in FIGS. 2A through 2C, the base portion 210 can include an input region that can include various types of input devices such as, for example, a keyboard, one or more buttons, an electrostatic touchpad to control a mouse cursor, etc. Also, although not shown, the display portion 220 can include a display with a display surface. In some embodiments, the display can be, for example, a touch sensitive display.

Extension 240, which is shown in FIGS. 2A through 2C, is used to couple the base portion 210 to the display portion 220 and to enable the computing device 200 to be moved between the various configurations shown in FIGS. 2A through 2C. In other words, the display portion 220 is coupled to the base portion 210 via the extension 240. As shown in FIGS. 2A through 2B, the display portion 220 has a hinge portion 228 that is coupled to the base portion 210 via the extension 240. The base portion 210 and the display portion 220 can be coupled by more than one extension 240. For example, two extensions 240, located at opposing ends of the base portion 210 and the display portion 220, can be used to couple the base portion 210 and the display portion 220.

As illustrated in FIGS. 2A through 2C, the extension 240 is configured to translate in direction D1 (e.g., translational direction D1) and in direction D2 (towards the back end 213 of the base portion 210) (e.g., translational direction D2). In some embodiments, the directions D1 and D2 can be orthogonal to (e.g., substantially orthogonal to) the axis H, which is the axis around which the display portion 220 is configured to rotate. Also, as illustrated in FIGS. 2A through 2C, the extension 240 can be configured to rotate in the clockwise direction B1 and in the counterclockwise direction B2 about the axis H.

Although not shown, in some embodiments, the extension 240 can be configured to slidably move (e.g., translate) along one or more guides (not shown) disposed within the base portion 210. Thus, the extension 240 (e.g., a proximal portion of the extension 240) can be coupled to the base portion 210 via one or more guides. Although not shown, the extension 240 can be configured to rotate about an axis (not shown) different from axis H.

When the computing device 200 is in the closed configuration shown in FIG. 2A, a surface 224 of the display portion 220 faces the top surface 214 of the base portion 210. When in the closed configuration, the surface 224 of the display portion 220 (or the display surface of the display) is aligned along a plane that is substantially parallel to a plane along which the bottom surface 212 and/or the top surface 214 of the base portion 210 is aligned.

When in the open configuration, the surface 224 of the display portion 220 no longer directly faces the top surface 214 of the base portion 210. Instead, the surface 224 of the display portion 220 (or the display surface of the display 226) is aligned along a plane that is nonparallel to a plane along which the bottom surface 212 and/or the top surface 214 of the base portion 210 is aligned. When the computing device 200 is in the open configuration the display portion 220 can be referred to as being in an open position with respect to the base portion 210.

The computing device 200 can be changed from the closed configuration shown in FIG. 2A to the open configuration shown in FIG. 2B by rotating the display portion 220 in a clockwise direction B1. The extension 240 is configured to slidably move (e.g., translate) along direction D2 and rotate in the counterclockwise direction B2, in response to the computing device 200 being moved from the closed configuration shown in FIG. 2A to the open configuration shown in 2B.

The computing device 200 can be moved from the open configuration to the closed configuration by rotating the display portion 220 in a counterclockwise direction B2. In such instances, the extension 240 is configured to slidably move (e.g., translate) along direction D1 and rotate in the clockwise direction B1.

The base portion 210 and the display portion 220 have a flat orientation when the computing device 200 is in the flat configuration shown in FIG. 2C. When in the flat configuration, the top surface 214 of the base portion 210 and the surface 224 of the display portion 220 are each aligned along planes that are parallel (or substantially parallel). Also, when in the flat configuration, at least a portion of the outer surface 222 of the display portion 220 is aligned along a plane I and the bottom surface 212 of the base portion 210 is also aligned along the plane I. When the computing device 200 is in the flat configuration, the display portion 220 can be referred to as being in a flat position with respect to the base portion 210.

The computing device 200 can be changed from the open configuration shown in FIG. 2B, to the flat configuration shown in FIG. 2C by rotating the display portion 220 in the clockwise direction B1 until at least a portion of the surface 222 of the display portion 220 and the bottom surface 212 of the base portion 210 are aligned along (or intersects or contacts) the plane I.

In this embodiment, in response to the display portion 220 being moved from the closed position shown in FIG. 2A to the open position shown in FIG. 2B, the extensions 240 are configured to slidably move and rotate. In some embodiments, in response to the computing device being moved from the open configuration shown in FIG. 2B to the closed configuration shown in FIG. 2A, the extensions 240 can be configured to slidably move (e.g., translate) within the guides 250 along direction D1 and rotate in the counterclockwise direction B2. In response to moving from the open configuration to the flat configuration, the extension 240 of the computing device 200 can be configured to slidably move (e.g., translate) along direction D2 and rotate in the counterclockwise direction B2.

As shown in FIG. 2A, the entire extension 240 and the hinge portion 228 of the display portion 210 are disposed within the base portion 210 of the computing device 200 when the computing device 200 is in the closed configuration. In some embodiments, at least a portion of the extension 240 and/or at least a portion of the hinge portion 228 of the display portion 210 are disposed outside of the base portion 210 of the computing device 200 when the computing device 200 is in the closed configuration shown in FIG. 2A. In response to the computing device 200 being moved to the open configuration and/or the flat configuration, at least a portion of the extension 240 and the hinge portion 228 of the display portion 210 are each moved from a position disposed within the base portion 210 to a position outside of the base portion 210. The portion of the extension 240 and the hinge portion 228 of the display portion 210 are each moved out of (e.g., translated out of) the base portion 210 (and is exposed) in response to the computing device 200 being moved from the closed configuration to the open configuration and/or the flat configuration. Thus, the portion of the extension 240 and the hinge portion 228 of the display portion 210 are each moved out of (e.g., translated out of) the base portion 210 (and is exposed) when the display portion 220 of the computing device 200 is rotated about the axis H (in the clockwise direction B1) from the closed position to the open position and/or the flat position.

The portion of the extension 240 and the hinge portion 228 of the display portion 210 are each moved inside of (e.g., translated into) the base portion 210 in response to the computing device 200 being moved from the open configuration and/or the flat configuration to the closed configuration. It follows that the portion of the extension 240 and the hinge portion 228 of the display portion 210 are each moved inside of (e.g., translated into) the base portion 210 when the display portion 220 of the computing device 200 is rotated about the axis H (in the counterclockwise direction B2) from the open position and/or the flat position to the closed position.

In some embodiments, the hinge portion 228 of the display portion 220 can have a different shape (or outer profile) than that shown in FIGS. 2A through 2C. For example, the hinge portion 228 can have a rectangular shape (or outer profile), a square shape (or outer profile), a circular shape (or outer profile), and so forth.

As shown in FIG. 2C, the axis H (and the hinge portion 228 of the display portion 220) is moved along a path Q represented by the curved dashed line in response to the computing device 200 being moved from the closed configuration to the flat configuration (via the open configuration), and in response to the computing device 200 being moved from the flat configuration to the closed configuration (via the open configuration). In some embodiments, the extension 240 can be configured to move within a guide (e.g., a curved guide) (not shown) so that the extension 240 moves the axis H and/or the hinge hundred 28 of the display portion 220 along the path Q Although not shown, in some embodiments, the computing device 200 may be configured so that the axis H (and the hinge 220 of the display portion 220) is moved along a path defining a straight line or a different path than that shown in FIG. 2C.

As shown in FIGS. 2A through 2C, in this embodiment, the extension 240 is rotated in the counterclockwise direction B2 in response to the computing device being moved from the closed configuration (shown in FIG. 2A) to the open configuration (shown in FIG. 2B) and/or the flat configuration (shown in FIG. 2C). The extension 240 is rotated in the clockwise direction B1 in response to the computing device being moved from open configuration (shown in FIG. 2B) and/or the flat configuration (shown in FIG. 2C) to the closed configuration (shown in FIG. 2A).

In this embodiment, the computing device 200 is configured so that the display portion 220 does not come in contact with a back end 213 (also can be referred to as a proximal end) of the base portion 210 in response to the computing device 200 being moved from the closed configuration (shown in FIG. 2A) to the open configuration (shown in FIG. 2B) and/or to the flat configuration (shown in FIG. 2C). In some embodiments, the computing device 200 (e.g., the extension 240, the hinge portion 228, the base portion 210, the display portion 220) can be configured so that at least a portion of the display portion 220 comes in contact with the back end 213 of the base portion 210 when the computing device 200 is in the open configuration or the flat configuration.

In some embodiments, the computing device 200 can include a mechanical mechanism that is configured to cause the extension 240 to translate and/or rotate in response to the display portion 220 being rotated in the clockwise direction B1 or in the counterclockwise direction B2. For example, a motor and gear mechanism can be configured to cause the extension 240 to translate out of the base portion 210 of the computing device 200 in response to the display portion 220 being rotated from the closed position (shown in FIG. 2A) to the open position (shown in FIG. 2B). In some embodiments, at least a portion of the extension 240 can be coupled to a ball and screw mechanism configured to cause the extension 240 to translate and/or rotate in response to the display portion 220 being rotated in the clockwise direction B1 or in the counterclockwise direction B2.

As illustrated in FIGS. 2A through 2C, the extension 240 is configured to translate and rotate as the display portion 220 is rotated in the clockwise direction B1 or the counterclockwise direction B2. In other words, the extension 240 is configured to translate and/or rotate concurrently with the display portion 220 rotating in the clockwise direction B1 or the counterclockwise direction B2.

In some embodiments, the extension 240 is configured to translate and/or rotate only within a portion of a range of the rotation of the display portion 220 in the clockwise direction B1 or the counterclockwise direction B2. For example, in some embodiments, the extension 240 is not configured to translate (e.g., translate in direction D1 or D2) and/or rotate (e.g., rotate in the clockwise direction B1 or the counterclockwise direction B2) when an angle between the surface 224 of the display portion 220 and the top surface 214 of the base portion 210 is less than a specified angle (e.g., 30 degrees, 60 degrees, 90 degrees, 120 degrees, 150 degrees), and the extension 240 is configured to translate and/or rotate when the angle between the surface 224 of the display portion 220 and the top surface 214 of the base portion 210 is greater than or equal to the specified angle. In some embodiments, a specified angle can be referred to as a threshold angle.

As a specific example, in some embodiments, in response to the computing device 200 being changed from the closed configuration (shown in FIG. 2A) to the open configuration (shown in FIG. 2B) the extension 240 is configured to translate (in direction D2) when an angle between the surface 224 of the display portion 220 and the top surface 214 of the base portion 210 is less than a specified angle (e.g., 30 degrees, 60 degrees, 90 degrees, 120 degrees, 150 degrees). The extension 240 can be configured to translate (in direction D2) as the angle between the surface 224 of the display portion 220 and the top surface 214 of the bottom portion 210 changes while less than the specified angle. The extension 240 can be configured to rotate (e.g., rotate in the counterclockwise direction B2) when the angle between the surface 224 of the display portion 220 and the top surface 214 of the base portion 210 is greater than or equal to the specified angle. The extension 240 can be configured to rotate (e.g., rotate in the counterclockwise direction B2) as the angle between the surface 224 of the display portion 220 and the top surface 214 of the bottom portion 210 changes while greater than or equal to the specified angle. In some embodiments, the opposite sequence, or a different sequence, can occur (e.g., can be performed) in response to the computing device 200 being changed from the open configuration to the closed configuration.

As another specific example, in some embodiments, in response to the computing device 200 being changed from the closed configuration (shown in FIG. 2A) to the open configuration (shown in FIG. 2B) the extension 240 is configured to translate (in direction D2) when an angle between the surface 224 of the display portion 220 and the top surface 214 of the base portion 210 is less than a first angle (e.g., 30 degrees, 60 degrees, 90 degrees, 120 degrees, 150 degrees). The extension 240 can be configured to translate (in direction D2) as the angle between the surface 224 of the display portion 220 and the top surface 214 of the bottom portion 210 changes while less than the first angle. The extension 240 can be configured to rotate (e.g., rotate in the counterclockwise direction B2) when the angle between the surface 224 of the display portion 220 and the top surface 214 of the base portion 210 is greater than or equal to the first angle, but less than a second angle. The extension 240 can be configured to rotate (e.g., rotate in the counterclockwise direction B2) as the angle between the surface 224 of the display portion 220 and the top surface 214 of the bottom portion 210 changes while greater than or equal to the first angle, but less than the second angle. The extension 240 can be configured to neither rotate nor translate when the angle between the surface 224 of the display portion 220 and the top surface 214 of the base portion 210 is greater than or equal to the second angle. In some embodiments, the opposite sequence, or a different sequence, can occur (e.g., can be performed) in response to the computing device 200 being changed from the open configuration to the closed configuration.

As yet another example, in some embodiments, the computing device 200 may be configured so that the extension 240 may not translate and/or rotate until an angle between the surface 224 of the display portion 220 and the top surface 214 of the base portion 210 is greater than or less than a specified angle (e.g., a threshold angle). Specifically, in response to the computing device 220 is being moved from the closed configured (shown in FIG. 2A) to the flat configuration (shown in FIG. 2C) the computing device 200 may be configured so that the extension 240 may not translate or rotate until an angle between the surface 224 of the display portion 220 and the top surface 214 of the base portion 210 is greater than a specified angle (e.g., a threshold angle).

As yet another specific example, in some embodiments, in response to the display portion 220 being initially moved from the closed configuration shown in FIG. 2A (e.g., started to be moved towards the open configuration shown in FIG. 2B), the extension 240 can be configured to translate and/or rotate (e.g., automatically translate and/or rotate) using a movement device (e.g., a motor, a gear mechanism, a spring-loaded mechanism). In some embodiments, in response to the display portion 220 being initially rotated from the closed configuration shown in FIG. 2A (e.g., started to be moved towards the open configuration shown in FIG. 2B) a few degrees to a slightly open position, the extension 240 can be configured to translate (in direction D2) and rotate (in counterclockwise direction B2) to the position shown in FIG. 2C using the movement mechanism. After the extension 240 has translated (in direction D2) and rotated (in counterclockwise direction B2) to the position shown in FIG. 2C using the movement mechanism, the extension 240 may not further translate and/or rotate as the display portion 220 is rotated from the slightly open position to the flat position with respect to the base portion 210 (so that the computing device 200 is in the flat configuration). In response to the display portion 220 being moved from the flat configuration shown in FIG. 2C, the extension 240 may not to translate and/or rotate until the display portion 220 is rotated to the slightly open position. In response to the display portion 220 being moved to the slightly open position, the extension 240 can be configured to translate (in direction D1) and rotate (in clockwise direction B1) to the position shown in FIG. 2A.

In some embodiments, the translation and/or rotation of the extension 240 when the display portion 220 is at the slightly open position can be caused using, for example, a movement device such as a motor, a gear mechanism, and/or a spring-loaded mechanism. In some embodiments, the translation and/or rotation of the extension 240 when the display portion 220 is at or around the slightly open position can be triggered by, for example, a switch (that is coupled to the movement device) being actuated (e.g., a switch being actuated in response to the display portion 220 being moved).

In some embodiments, the computing device 200 may be configured so that the display portion 220 may optionally be prevented from rotating beyond a specified point. For example, a locking mechanism can be activated (e.g., actuated) so that the display portion 220 may not be rotated about the axis H beyond a specified position. In some embodiments, the locking mechanism may later be deactivated so that the display portion 220 may be rotated about the axis H beyond a specified position.

FIGS. 3A through 3D are diagrams that illustrate a computing device 300 in various configurations. The computing device 300 can be similar to, for example, the computing device 100 shown in FIG. 1. Specifically, FIG. 3A is a diagram of a side view of a portion of a computing device 300, including a base portion 310 and a display portion 320, in a closed configuration. FIGS. 3B and 3C are diagrams of side views of the portion of the computing device 300 shown in FIG. 3A in an open configuration, and FIG. 3D is a diagram of a side view of the portion of the computing device 300 shown in FIGS. 3A through 3C in a flat configuration.

As shown in FIGS. 3A through 3D, the display portion 320 has an outer surface 322 that defines at least a portion of an outer cover of the computing device 300 when the computing device is in the closed configuration. The base portion 310 has a bottom surface 312 and a top surface 314.

Although not shown, the base portion 310 can include an input region that can include various types of input devices such as, for example, a keyboard, one or more buttons, an electrostatic touchpad to control a mouse cursor, etc. Also, although not shown, the display portion 320 can include a display with a display surface. In some embodiments, the display can be, for example, a touch sensitive display.

Extension 340, which is shown in FIGS. 3A through 3C, is used to couple the base portion 310 to the display portion 320 and enable the computing device 300 to be moved between the various configurations shown in FIGS. 3A through 3C. In other words, the display portion 320 is coupled to the base portion 310 via the extension 340. As shown in FIGS. 3A through 3B, the display portion 320 has a hinge portion 328 that is coupled to the base portion 310 via the extension 340. The base portion 310 and the display portion 320 can be coupled by more than one extension 340. For example, two extensions 340, located at opposing ends of the base portion 310 and the display portion 320, can be used to couple the base portion 310 and the display portion 320.

As illustrated in FIGS. 3A through 3D, the extension 340 is configured to translate in direction K1 (e.g., translational direction K1) and in direction K2 (towards the back end 313 (and away from an input region) of the base portion 310) (e.g., translational direction K2). In some embodiments, the directions K1 and K2 can be orthogonal to (e.g., substantially orthogonal to) the axis J, which is the axis around which the display portion 320 is configured to rotate. Also, as illustrated in FIGS. 3A through 3C, the extension 340 can be configured to rotate in the clockwise direction N1 and in the counter-clockwise direction N2 about the axis J.

Although not shown, in some embodiments, the extension 340 can be configured to slidably move (e.g., translate) along one or more guides (not shown) disposed within the base portion 310. Thus, the extension 340 can be coupled to the base portion 310 via one or more guides. Although not shown, the extension 340 can be configured to rotate about an axis (not shown).

Similar to the computing devices described above, the computing device 300 can be moved from the closed configuration (shown in FIG. 3A) to the flat configuration (shown in FIG. 3D) via the open configurations (shown in FIGS. 3B and 3C). Also, the computing device 300 can moved from the flat configuration (shown in FIG. 3D) to the closed configuration (shown in FIG. 3A) via the open configurations (shown in FIGS. 3B and 3C).

In this embodiment, the computing device 300 can be changed from the closed configuration shown in FIG. 3A to the open configuration shown in FIG. 3B by rotating the display portion 320 in a clockwise direction N1. The extension 340 does not slidably move (e.g., translate) or rotate in response to the computing device 300 being changed from the closed configuration shown in FIG. 3A to the open configuration shown in FIG. 3B. However, in response to the computing device 300 being changed from the open configuration shown in FIG. 3B to the open configuration shown in FIG. 3C, the extension 340 is slidably moved (e.g., translated) along direction K2 and rotated in the counterclockwise direction N2 in response to the display portion 320 being rotated in the clockwise direction N1. Finally, the computing device 300 can be changed from the open configuration shown in FIG. 3C, to the flat configuration shown in FIG. 3C by rotating the display portion 320 in the clockwise direction N1 until at least a portion of the surface 322 of the display portion 320 and the bottom surface 312 of the base portion 310 are aligned along (or contact or intersect) plane M.

As shown in FIGS. 3B through 3D, the extension 340 is rotated in the counterclockwise direction N2 in response to the computing device being moved from the open configuration shown in FIG. 3B to the open configuration shown in FIG. 3C and/or the flat configuration shown in FIG. 3D. The extension 340 is rotated in the clockwise direction N1 in response to the computing device being moved from the open configuration shown in FIG. 3C and/or the flat configuration shown in FIG. 3D to the open configuration shown in FIG. 3B.

As shown in FIG. 3A, the entire extension 340 and the hinge portion 328 of the display portion 310 are disposed within the base portion 310 of the computing device 300 when the computing device 300 is in the closed configuration shown in FIG. 3A. In some embodiments, at least a portion of the extension 340 and/or the hinge portion 328 of the display portion 310 are disposed outside of the base portion 310 of the computing device 300 when the computing device 300 is in the closed configuration shown in FIG. 3A. As shown in FIG. 3B, the entire extension 340 and a portion of (e.g., only a portion of) the hinge portion 328 of the display portion 310 are disposed within the base portion 310 of the computing device 300 when the computing device 300 is in the open configuration. In some embodiments, at least a portion of the extension 340 is disposed outside of the base portion 310 of the computing device 300 when the computing device 300 is in the open configuration shown in FIG. 3B. When the computing device 300 is in the open configuration shown in FIG. 3C or the flat configuration shown in FIG. 3D, at least a portion of the extension 340 and at least a portion of the hinge portion 328 of the display portion 310 are each in a position outside of the base portion 310.

In some embodiments, the hinge portion 328 of the display portion 320 can have a different shape (or outer profile) than that shown in FIGS. 3A through 3D. For example, the hinge portion 328 can have a rectangular shape (or outer profile), a square shape (or outer profile), a circular shape (or outer profile), and so forth.

In this embodiment, in response to the display portion 320 being moved from the open position shown in FIG. 3B to the open position shown in FIG. 3C, a bottom portion 327 of the display portion 320 contacts a back end 313 of the base portion 310. As the display portion 320 is rotatably move around the axis J from the open position shown in FIG. 3B to the open position shown in FIG. 3C (in the clockwise direction N1), the hinge portion 328, which is operably coupled to the extension 340, pulls the extension 340 (e.g., pulls the extension 340 using a lever-type motion or action). Specifically, the hinge portion 328 can be configured to pull at least a portion of the extension 340 out of the base portion 310 so that the extension 340 moves along direction K2 and rotates in the counterclockwise direction N2 (as the display portion 320 is rotated in the clockwise direction N1). At least a portion of the extension 340 is disposed outside of the base portion in response to being pulled by the hinge portion 328 of the display portion 320 to the position shown in FIG. 3C. As the display portion 320 is rotatably moved to the flat position shown in FIG. 3D, the hinge portion 328 of the display portion 320 continues to pull the extension 340 until the extension is in the position shown in FIG. 3D.

In some embodiments, the extension 340 (or a device coupled to the extension 340) can be configured to resist the pulling of the hinge portion 328 of the display portion 320. For example, the extension 340 can be connected to a device such as a spring, or other type of mechanism, that pulls the extension 340 in a direction opposite the pulling of the hinge portion 328 as the display portion 320 is rotatably moved around the axis J in the clockwise direction N1.

In this embodiment, the bottom portion 327 of the display portion 320 contacts the back end 313 of the base portion 310 when the surface 324 of the display portion 320 is aligned along (or approximately aligned along) the plane L shown in FIGS. 3B and 3C. When the surface 324 of the display portion 320 is aligned along the plane L, an angle between the surface 324 of the display portion 320 and the top surface 314 of the base portion 310 is approximately a right angle (e.g., a 90° angle). In some embodiments, the bottom portion 327 of the display portion 320 may be configured to contact the back end 313 of the base portion 310 when an angle between the surface 324 of the display portion 320 and the top surface 314 of the base portion 310 is acute and/or obtuse.

In this embodiment, the computing device 300 is configured so that the display portion 320 does not come in contact with a back end 313 (also can be referred to as a proximal end)

of the base portion 310 in response to the computing device 300 being moved from the closed configuration (shown in FIG. 3A) to the open configuration (shown in FIG. 3B). Specifically, the base portion 310 has a curved portion 311 that is defined so that the bottom portion 327 of the base portion 320 does not come in contact with the base portion 310. In some embodiments, the curved portion 311 can define a portion of the back end 313 of the base portion 310.

In some embodiments, in response to the surface 324 of the display portion 320 being moved at, or beyond, for example, the plane L (e.g., started to be moved towards the open configuration shown in FIG. 3C), the extension 340 can be configured to translate and/or rotate in response to a movement device (e.g., a motor, a gear mechanism, and/or a spring-loaded mechanism). In some embodiments, the translation and rotation of the extension 340 when the display portion 320 is at or around the slightly open position can be triggered by, for example, a switch (that is coupled to the movement device) being actuated in response to the display portion 320 being rotated from the open configuration shown in FIG. 3B at or beyond, for example, the plane L.

FIG. 4A is a block diagram that illustrates a position detection module 410 and an activation module 420 of a computing device 400. Also, the computing device 400 includes a memory 440 for storing a position file 430. In this embodiment, physical components of the computing device 400 such as a display portion, a base portion, an extension, etc. are not shown.

The position detection module 410 is configured to determine that at least a portion of the computing device 400, such as a display portion, is in a specified position (with respect to another portion (e.g., base portion) of the computing device 400). In response to the determination by the position detection module 410, the activation module 420 is configured to activate (e.g., change to an active/on state or operational state), or deactivate (e.g., changed to a deactivated/off state or standby state) one or more movement devices based on the position file 430. The movement devices can be configured to cause, for example, translation and/or rotation of an extension of the computing device 400. The position file 430 can include information indicating which movement devices should be activated or deactivated (or prevented from moving) when the computing device 400 is in the specified position.

For example, the position detection module 410 can be configured to determine that the display portion of the computing device 400 is being moved from the closed position. The position detection module 410 can send an indicator that the display portion of the computing device 400 is being moved from the closed position to the activation module 420 (or the activation module 420 can be configured to request information about the position of the computing device 400). The activation module 420 can be configured to activate one or more movement devices to cause (or prevent) an extension of the computing device 400 to translate away from a base portion of the computing device 400 in response to the display portion of the computing device 400 being moved from the closed position based on the indicator that the display portion of the computing device 400 is being moved from the closed position and based on information included in the position file 430. An example of a position file is shown in FIG. 4B.

FIG. 4B illustrates a position file 450 that can be stored in the memory 440 of the computing device 400 shown in FIG. 4A. As shown in FIG. 4B, the position file includes indicators of activation or deactivation of movement devices 470 associated with a computing device portion position 460 (e.g., a position of a display portion of a computing device). The computing device positions 460 include positions A through C.

The movement devices 470 include movement device Z1 and movement device Z2. The movement device P1 can be configured to cause, for example, translation of an extension of the computing device and the movement device Z2 can be configured to cause, for example, rotation of the extension of the computing device.

For example, when the portion of the computing device 400 is in position A, the position file 450 indicates that the movement device Z1 and the movement device Z2 should be in deactivated state as indicated by "N." As another example, when the computing device 400 is in position B, the position file 450 indicates that the movement device Z1 and movement device Z2 should be in an activated state as indicated by "Y."

In some embodiments, the position file 450 can be a default position file that is stored in the memory 440 of the computing device 400. In some embodiments, one or more portions of the position file 450 can be defined by (e.g., customized by), for example, a user of the computing device 400.

Referring back to FIG. 4A, the position detection module 410 can be configured to determine that at least a portion of the computing device 400 is in a particular position based on the positions (e.g., relative positions, combinations of positions) of physical components (e.g., display portion, base portion) of the computing device 400. For example, the position detection module 400 can be configured to determine that a display portion of the computing device 400 is in an open position in response to the display portion of the computing device 400 being rotated less than 180 degrees with respect to a base portion of the computing device 400.

In some embodiments, the position of a display portion of the computing device 400 with respect to a base portion of the computing device 400 can be determined based on signals from, for example, a series of electrical contacts, mechanical switches, etc. In some embodiments, a rotational position of a display portion of the computing device 400 with respect to a base portion of the computing device 400 can be determined based on signals from, for example, a series of electrical contacts, mechanical switches, etc. around a hinge portion coupled to the display portion of the computing device 400. In some embodiments, movement to a specified point (e.g., a specified rotational position with respect to a base portion of the computing device 400), beyond a point, and/or so forth, can be detected using a mechanical switch that can be actuated, an electrical contact, and/or so forth.

In some embodiments, one or more portions of the components shown in the computing device 400 in FIG. 4A can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some embodiments, one or more portions of the position detection module 410 can be, or can include, a software module configured for execution by at least one processor (not shown). In some embodiments, the functionality of the components can be included in different modules and/or components than those shown in FIG. 4A. For example, although not shown, the functionality of the position detection module 410 can be included in a different module than the position detection module 410, or divided into several different modules (not shown).

In some embodiments, the computing device 400 can be included in a network. In some embodiments, the network can include multiple computing devices (such as computing device 400) and/or multiple server devices (not shown). Also, although not shown in FIG. 4, the computing device 400 can be configured to function within various types of network environments. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can be have portions based on various protocols such as Internet Protocol (IP) and/or a proprietary protocol. The network can include at least a portion of the Internet.

Memory 440 can be any type of memory device such as a random-access memory (RAM) component or a disk drive memory. As shown in FIG. 4, the memory 440 is a local memory included in the computing device 400. Although not shown, in some embodiments, the memory 440 can be implemented as more than one memory component (e.g., more than one RAM component or disk drive memory) within the computing device 400. In some embodiments, the memory 440 can be, or can include, a non-local memory (e.g., a memory not physically included within the computing device 400) within a network (not shown). For example, the memory 440 can be, or can include, a memory shared by multiple computing devices (not shown) within a network. In some embodiments, the memory 440 can be associated with a server device (not shown) on a client side of a network and can be configured to serve several computing devices on the client side of the network.

Figure 5:
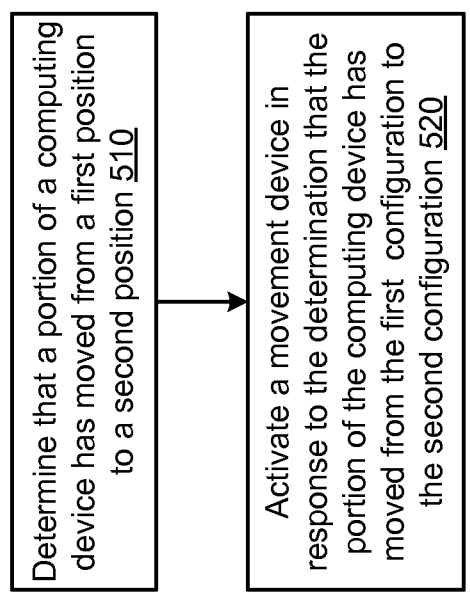
FIG. 5 is a flowchart that illustrates a method for changing the activation state of a movement device of a computing device based on a position change of at least a portion of the computing device.

FIG. 5 is a flowchart that illustrates a method for changing the activation state of a movement device of a computing device based on a position change of at least a portion of the computing device. In some embodiments, at least some portions of the method shown in FIG. 5 can be performed by the components of the computing device shown in FIG. 4.

As shown in FIG. 5, movement of a portion of a computing device from a first position to a second position can be determined (block 510). For example, a position detection module (such as position detection module 410 shown in FIG. 4A) can be configured to determine that a portion (e.g., a display portion) of the computing device has moved from a closed position to a flat position. In some embodiments, a rotational position of the display portion with respect to the base portion of the computing device can be detected based on a signal from a switch that is actuated in response to the display surface being rotated with respect to the base portion of the computing device.

A movement device can be activated in response to the determination that the portion of the computing device has moved from the first position to the second position (block 520). For example, a movement device, such as a motor, can be activated in response to the portion of the computing device changing from, or as the portion of the computing device is being changed from, a first position to a second position. Activation of the motor can cause, for example, an extension of the computing device to translate and/or rotate.

Figure 6:
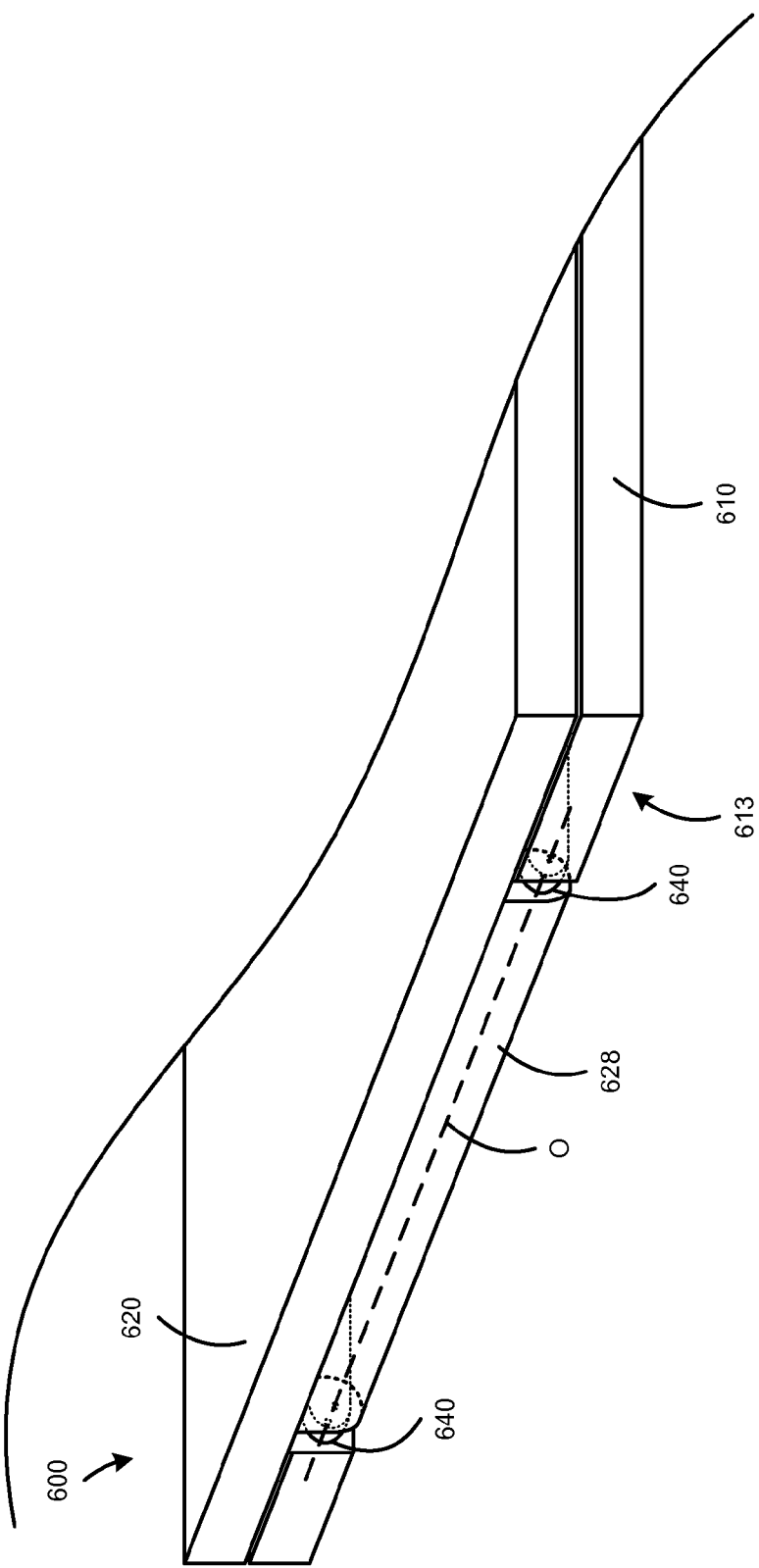
FIG. 6 is a perspective view of a computing device.

FIG. 6 is a perspective view of a computing device 600. As shown in FIG. 6, the computing device 600, which is in a closed configuration, includes a display portion 620 and a base portion 610. The display portion 620 has a hinge portion 628 that is coupled to the base portion 610 via extensions 640. As shown in FIG. 6, one of the extensions 640 is disposed on one side of the hinge portion 628 and another of the extensions 640 is disposed on another side of the hinge portion 620. Thus, the hinge portion 628 extends as a single hinge portion between the extensions 640.

In this embodiment, the extensions 640 are disposed within the base portion 610 when the computing device 600 is in the closed configuration. In some embodiments, at least a portion of the extensions 640 are disposed outside of the base portion 610 when the computing device 600 is in the closed configuration.

As shown in FIG. 6, the display portion 620 is configured to rotate about an axis O through the hinge portion 628 and the extensions 640. In some embodiments, the hinge portion 628 of the display portion 620 can be coupled to the extensions 640 via one or more pins (not shown).

In this embodiment, the hinge portion 628 and the extensions 640 have a collective width that is less than a width of a back end 613 the base portion 610. In some embodiments, the hinge portion 628 and the extensions 640 can collectively define a width that is greater than or equal to a width of the back end 613 of the base portion 610.

As shown in FIG. 6, the display portion includes only one hinge portion-hinge portion 628. In some embodiments, the display portion 620 can have more than one hinge portion. Also as shown in FIG. 6, the computing device 600 includes multiple extensions 640. In some embodiments, the computing device 600 can include a single extension or can include more than two extensions.

Although the extensions 640 and the hinge portion 628 are shown in FIG. 6 as being approximately centered within the back end 613 of the base portion 610, in some embodiments, the extension 640 and/or the hinge portion 628 may not be centered within the back end 613 of the base portion 610. In some embodiments, one or more of the extension 640 and/or the hinge portion 628 may be skewed to the left side or right side of the computing device 600.

FIGS. 7A and 7B are diagrams that illustrate a computing device 700 in various configurations. Specifically, FIG. 7A is a diagram of a side view of a portion of a computing device 700, including a base portion 710 and a display portion 720, in a closed configuration. FIG. 7B is a schematic diagram of a side view of the portion of the computing device 700 shown in FIG. 7A in a flat configuration. Although not shown, the computing device 700 can also be moved to an open configuration.

As shown in FIGS. 7A through 7D, the display portion 720 has an outer surface 722 that defines at least a portion of an outer cover of the computing device 700 when the computing device is in the closed configuration. The base portion 710 has a bottom surface 712 and a top surface 714.

Although not shown, the base portion 710 can include an input region that can include various types of input devices such as, for example, a keyboard, one or more buttons, an electrostatic touchpad to control a mouse cursor, etc. Also, although not shown, the display portion 720 can include a display with a display surface. In some embodiments, the display can be, for example, a touch sensitive display.

Similar to the computing devices described above, the computing device 700 can be moved from the closed configuration (shown in FIG. 7A) to the flat configuration (shown in FIG. 7B). In this embodiment, the computing device 700 can be changed from the closed configuration shown in FIG. 7A to the flat configuration shown in FIG. 7B by rotating the display portion 720 in a clockwise direction X1 (about axis V). In this embodiment, the computing device 700 can be changed from the flat configuration shown in FIG. 7B to the open configuration shown in FIG. 7A by rotating the display portion 720 in a counterclockwise direction X2 (about axis V).

As shown in FIGS. 7A and 7B, the base portion 710 includes a recess 711 (also can be referred to as a notch) into which a bottom portion 725 of the display portion 720 may be inserted so that the computing device 700 may be moved to the flat configuration. Also, as shown in FIGS. 7A and 7B, a pad 717 is coupled to the bottom surface 712 of the base portion 710 that enables the computing device 700 to be in the flat configuration. In some embodiments, the computing device 700 may be configured so that the computing device 700 may be in the flat configuration without the pad 717 or the recess 711.

The base portion 710 and the display portion 720 have a flat orientation when the computing device 700 is in the flat configuration shown in FIG. 7B. When in the flat configuration, the top surface 714 of the base portion 710 and the surface 724 of the display portion 720 are each aligned along planes that are parallel (or substantially parallel). Also, when in the flat configuration, at least a portion of the outer surface 722 of the display portion 720 is aligned along a plane W and the bottom surface 712 of the base portion 710 is also aligned along the plane W. When the computing device 700 is in the flat configuration, the display portion 720 can be referred to as being in a flat position with respect to the base portion 710.

In this embodiment, the computing device 700 is configured so that the display portion 720 does not come in contact with a back end 713 (also can be referred to as a proximal end) of the base portion 710 in response to the computing device 700 being moved from the closed configuration (shown in FIG. 7A) to the flat configuration (shown in FIG. 7B). Specifically, the back end 713 has a curved portion that is defined so that the bottom portion 725 of the base portion 720 does not come in contact with the base portion 710.

Figure 8A:
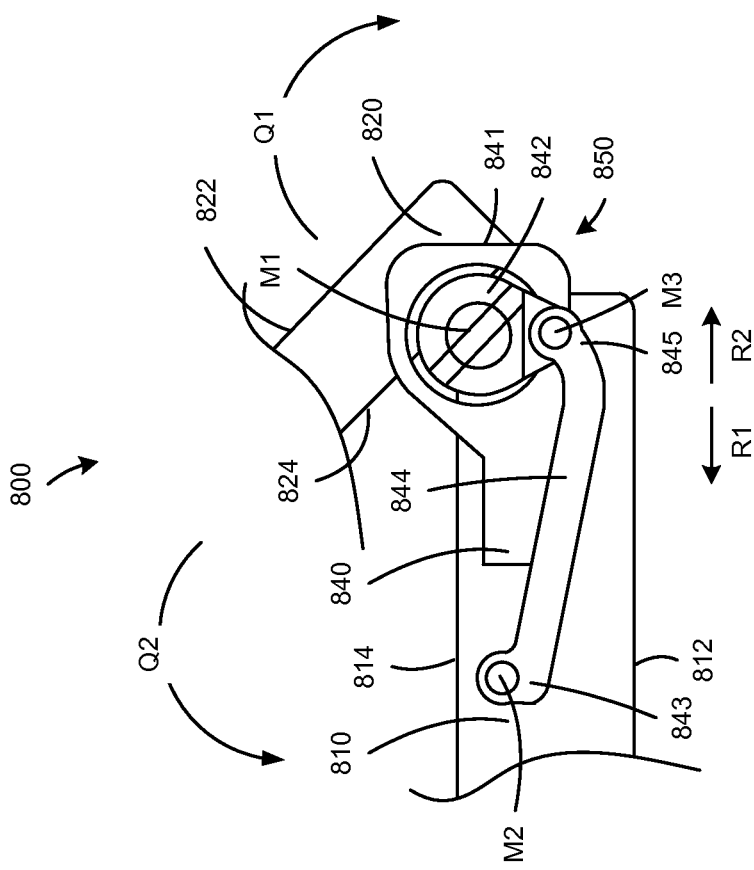
FIG. 8A is a diagram of a side view of a portion of a computing device 800, including a base portion and a display portion, in a closed configuration.
Figure 8B:
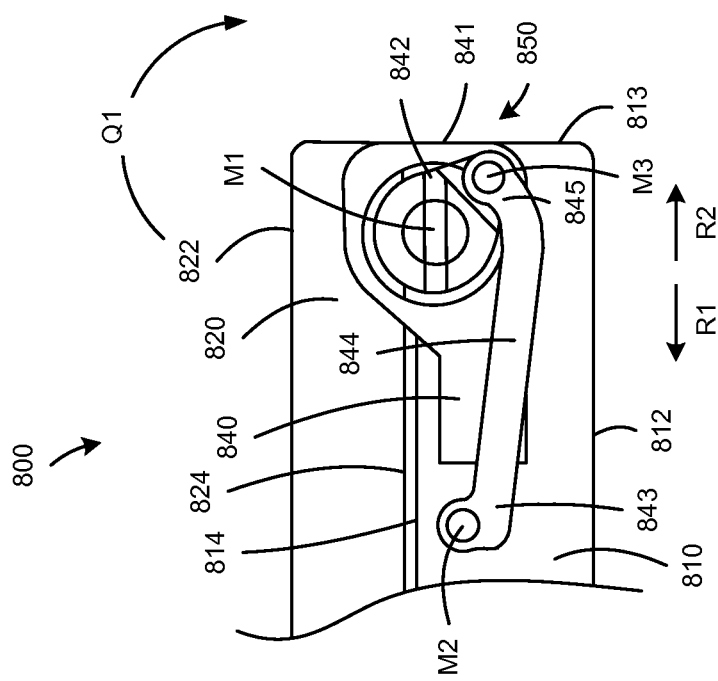

FIGS. 8A through 8D are diagrams that illustrate a computing device 800 in various configurations. The computing device 800 can be similar to, for example, the computing device 100 shown in FIG. 1. Specifically, FIG. 8A is a diagram of a side view of a portion of a computing device 800, including a base portion 810 and a display portion 820, in a closed configuration. FIGS. 8B through 8D are diagrams of side views of the portion of the computing device 800 shown in FIG. 8A in an open configuration.

As shown in FIGS. 8A through 8D, the display portion 820 has an outer surface 822 that defines at least a portion of an outer cover of the computing device 800 when the computing device is in the closed configuration. The base portion 810 has a bottom surface 812 and a top surface 814.

Although not shown, the base portion 810 can include an input region that can include various types of input devices such as, for example, a keyboard, one or more buttons, an electrostatic touchpad to control a mouse cursor, etc. Also, although not shown, the display portion 820 can include a display with a display surface. In some embodiments, the display can be, for example, a touch sensitive display.

In the embodiment illustrated in FIGS. 8A through 8D, the computing device 800 includes a shifting hinge 850. The shifting hinge 850 includes an extension 840, a rotating mechanism 842, and a connecting rod 844. The rotating mechanism 842 is configured to rotate in a clockwise direction and a counterclockwise direction about axis M1 within a portion (e.g., a distal portion) of the extension 840. The rotating mechanism 842, although configured to rotate within the portion of the extension 840, is fixedly coupled to the display portion 820.

FIGS. 8A through 8D are illustrated with the shifting hinge 850 exposed so that the components of the shifting hinge 850 may be seen while the shifting hinge is operating. In some embodiments, the shifting hinge 850, or portions thereof, may be disposed within the base portion 810 (e.g., the connecting rod 844 may be disposed within the base portion 810) and/or the display portion 820 so that they may not be viewed by a user when the shifting hinge 850 is operated.

As shown in FIGS. 8A through 8D, the connecting rod 844 has a proximal end 843 and a distal end 845 coupled (e.g., rotatably coupled) to the rotating mechanism 842. The proximal end 843 of the connecting rod 844 is rotatably coupled to at least a portion of the base portion 810 of the computing device 800. The proximal end 843 is configured to rotate about axis M2, which is at a fixed position within the base portion 810. The distal end 845 of the connecting rod 844 is configured to rotate about an axis M3, which moves with the rotation of the rotating mechanism 842.

The shifting hinge 850 is configured so that as the display portion 820 is rotated in direction Q1, the rotating mechanism 842 is also rotated in direction Q1. Because the rotating mechanism 842 is shaped like a cam with the distal end 845 of the connecting rod 844 coupled to the rotating mechanism 842 and the proximal end 843 of the connecting rod 844 rotatably coupled to a fixed position with respect to the base portion 810, as the rotating mechanism 842 rotates, the extension 840 is moved by the connecting rod 844 along direction R2 (as shown by the progression from FIGS. 8A to 8D). Similarly, the shifting hinge 850 is configured so that as the display portion 820 is rotated in direction Q2, the rotating mechanism 842 is also rotated in direction Q2. As the rotating mechanism 842 rotates, the extension 840 is moved by the connecting rod 844 along direction R1 (as shown by the progression from FIGS. 8D to 8A).

Thus, as illustrated in FIGS. 8A through 8D, the extension 840 is configured to translate in direction R1 (e.g., translational direction R1) and in direction R2 (towards the back end 813 (and away from an input region) of the base portion 810) (e.g., translational direction R2). In some embodiments, the directions R1 and R2 can be orthogonal to (e.g., substantially orthogonal to) the axis M1, axis M2, and/or axis M3. Although not shown in FIGS. 8A through 8D, the extension 840 can be configured to rotate in the clockwise direction Q1 and/or in the counterclockwise direction Q2 as the extension is moved in direction R1 or R2.

In some embodiments, the proximal end 843 can be configured to rotate about an axis that is configured to move with respect to the base portion when the shifting hinge 850 is operated. As shown in FIGS. 8A through 8D, the rotating mechanism 842 is a cam. In some embodiments, the rotating mechanism 842 may not be a cam and/or may have a different shape (e.g., a rectangular shape (or outer profile), a square shape (or outer profile), a circular shape (or outer profile)) than that shown in FIGS. 8A through 8D.

Extension 840, which is shown in FIGS. 8A through 8C, is used to couple the base portion 810 with the display portion 820 and enable the computing device 800 to be moved between the various configurations shown in FIGS. 8A through 8D. In other words, the display portion 820 is coupled to the base portion 810 via the extension 840. In some embodiments, the base portion 810 and the display portion 820 can be coupled by more than one extension 840. For example, two extensions 840, located at opposing ends of the base portion 810 and the display portion 820, can be used to couple the base portion 810 and the display portion 820.

Although not shown, in some embodiments, the extension 840 can be configured to slidably move (e.g., translate) along one or more guides (not shown) disposed within the base portion 810. Thus, the extension 840 can be coupled to the base portion 810 via one or more guides. Although not shown, the extension 840 can be configured to rotate about an axis (not shown).

Although not shown in FIGS. 8A through 8D, the computing device 800 can be configured so that the computing device 800 can be moved from one or more of the open configurations (shown in FIGS. 8B through 8D) to a flat configuration (not shown). In such embodiments, the rotating mechanism 842, the connecting rod 844, and/or the extension 840 can be configured so that the extension 840 can be moved (e.g., far enough out of the base portion 810 along direction R2) so that the display portion 820 may be moved to a flat position with respect to the base portion 810.

As shown in FIGS. 8A through 8D, the rotating mechanism 842 is configured to rotate approximately 130°. In some embodiments, the rotating mechanism 842, the connecting rod 844, and/or the extension 840 can be configured so that the extension 840 may rotate more than 130° (e.g., 150°, 210°) or less than 130° (e.g., 110°, 90°). For example, the rotating mechanism 842, the connecting rod 844, and/or the extension 840 can be configured so that the extension 840 may rotate 180°. In such embodiments, the display portion 820 may be configured to rotate from the closed position with respect to the base portion 810 shown in FIG. 8A to a flat position with respect to the base portion 810 (not shown).

As shown in FIG. 8A, the entire extension 840 is disposed within the base portion 810 of the computing device 800 (or at least has a distal surface 841 that is aligned with a backend 813 of the computing device 800) when the computing device 800 is in the closed configuration shown in FIG. 8A. In some embodiments, at least a portion of the extension 840 (or the distal surface 841 of the extension 840) is disposed outside of the base portion 810 of the computing device 800 when the computing device 800 is in the closed configuration shown in FIG. 8A.

In some embodiments, the extension 840 (or a device coupled to the extension 840) can be configured to resist the translational movement of the extension 840 as the display portion 820 is rotated. For example, the extension 840 can be connected to a device such as a dampener, spring, or other type of mechanism, that applies a force (e.g., friction) against (e.g., pulls) the extension 840 in a direction opposite the translational movement of the extension 840 as the display portion 820 is rotatably moved in the clockwise direction Q1.

In some embodiments, the extension 840 (and/or a portion associated with the extension 840) can include a stop configured to limit movement of the extension 840. For example, the extension 840 can include a tab or protrusion configured to contact another tab or protrusion coupled to the base portion 810 to limit movement of the extension 840 (in direction R1 or direction R2). Although not shown, in some embodiments, the extension 840 can be configured to slidably move within a guide. The guide and/or extension 840 can include one or more detents and/or stops.

Although not shown, in some embodiments, the computing device 800 can include a mechanical mechanism that is configured to cause the extension 840 to translate and/or rotate in response to the display portion 820 being rotated in the clockwise direction Q1 or in the counterclockwise direction Q2. For example, a motor and gear mechanism can be configured to cause the extension 840 to translate out of the base portion 810 of the computing device 800 in response to the display portion 820 being rotated from the closed position (shown in FIG. 8A) to one of the open positions (shown in FIGS. 8B through 8D).

Figure 9A:
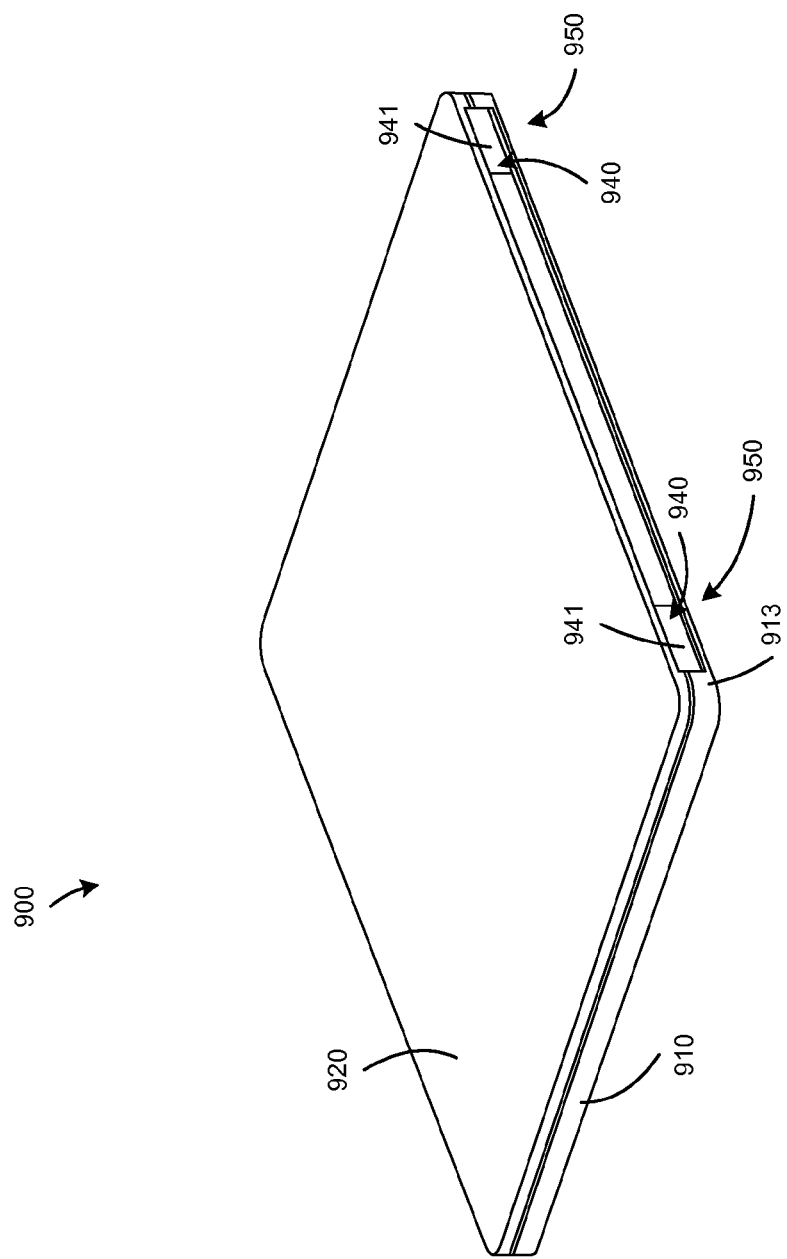
FIG. 9A is a diagram of a computing device in a closed configuration, according to an embodiment.

FIG. 9A is a diagram of a computing device 900 in a closed configuration, according to an embodiment. As shown in FIG. 9A, the computing device 900 includes a display portion 920 and a base portion 910. The computing device 900 also includes shifting hinges 950 that each include an extension 940. Distal surfaces 941 of the extension 940 are approximately aligned with a back end surface 913 of the computing device 900, or disposed within the computing device 900 when the computing device 900 is in the closed configuration.

Figure 9B:
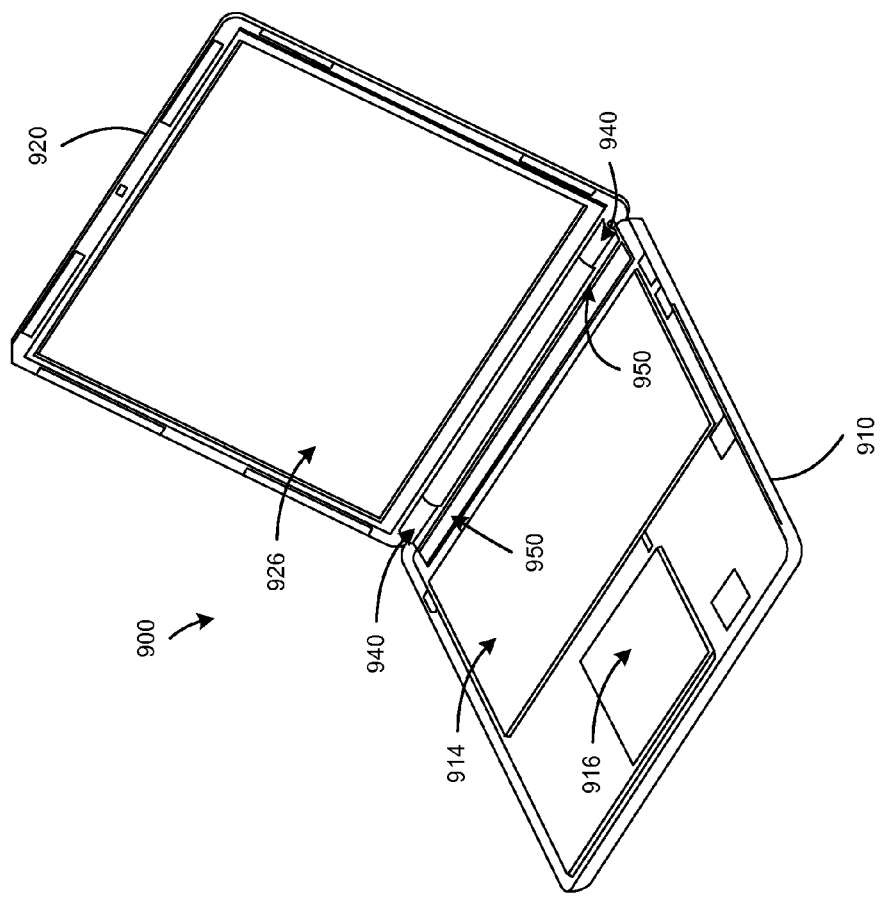
FIG. 9B is a diagram of the computing device shown in FIG. 9A in an open configuration, according to an embodiment.

FIG. 9B is a diagram of the computing device 900 shown in FIG. 9A in an open configuration, according to an embodiment. FIG. 9B illustrates portions of the extensions 940 when the computing device 900 is in the open configuration. As shown in FIG. 9B, the computing device 900 includes a display 926, a keyboard 914, and a mouse trackpad 916.

Implementations of the various techniques described herein may be implemented in digital electronic circuitry, or in computer hardware, firmware, software, or in combinations of them. Implementations may implemented as a computer program product, i.e., a computer program (e.g., tangibly) embodied in, e.g., in a machine-readable storage device (computer-readable medium, a non-transitory computer-readable storage medium, a tangible computer-readable storage medium), for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A computing device, comprising:
    a base portion including an input region;
    a display portion;
    a rotating mechanism fixedly coupled to the display portion;
    a connecting rod coupled to the rotating mechanism and to the base portion, the rotating mechanism and connecting rod are configured to move a bottom portion of the display portion in a direction away from the input region in response to the display portion being rotated about an axis of the rotating mechanism from a closed position with respect to the base portion toward a flat position with respect to the base portion,
    wherein the rotating mechanism is configured to rotate in response to the display portion being rotated about the axis of the rotating mechanism.

2. The computing device of claim 1, further comprising:
    an extension member coupled to the rotating mechanism; and
    a guide coupled to the based portion and within which a portion of the extension member is configured to slidably move in response to the bottom portion of the display portion moving in the direction away from the input region.

3. The computing device of claim 1, further comprising:
    an extension member coupled to the rotating mechanism and configured to only move the bottom portion of the display portion in the direction away from the input region in response to the display portion being rotated within a portion of a range of rotation of the display portion.

4. The computing device of claim 1, wherein the display portion includes a display surface that faces the input region of the base portion when the display portion is in the closed position, the display surface of the display portion is aligned along a plane substantially parallel to a plane along which a bottom surface of the base portion is aligned when the display portion is in the flat position.

5. The computing device of claim 1, further comprising:
    an extension member coupled to the rotating mechanism and configured to translate when the bottom portion of the display portion is moved in the direction away from the input region.

6. The computing device of claim 1, further comprising:
    a first extension member disposed on a first side of the bottom portion along the axis of the rotating mechanism; and
    a second extension member disposed on a second side of the bottom portion along the axis.

7. The computing device of claim 1, wherein the connecting rod is rotatably coupled to the rotating mechanism and rotatably coupled to the base portion at a fixed location along the base portion.

8. The computing device of claim 1, further comprising:
    an extension member coupled to the rotating mechanism; and
    a movement device configured to cause, in response to the display portion being moved from the closed position, the extension member to slidably move in the direction away from the input region.

9. The computing device of claim 1, wherein the axis is substantially orthogonal to the direction in which the bottom portion is configured to be moved.

10. A computing device, comprising:
    a base portion including an input region;
    a display portion configured to rotate about an axis;
    an extension member coupled to the base portion and coupled to the display portion, the extension member including a portion configured to translate in a direction orthogonal to the axis in response to the display portion being rotated about the axis; and
    a rotating mechanism rotatably coupled to the extension member and configured to function as a cam.

11. The computing device of claim 10, wherein the portion of the extension member is configured to translate from a position disposed within the base portion to a position disposed outside of the base portion.

12. The computing device of claim 10, further comprising:
    a connecting rod having a distal end rotatably coupled to the rotating mechanism and having a proximal end rotatably coupled to the base portion.

13. The computing device of claim 10, wherein the axis is a first axis,
    the computing device further comprising:
    a connecting rod having a distal end rotatably coupled to the rotating mechanism, the connecting rod having a proximal end coupled to a second axis at a fixed location with respect to the base portion.

14. The computing device of claim 10, wherein the display portion includes a bottom portion configured to contact a back end of the base portion and including a hinge portion configured to pull the extension member in response to the display portion being rotated about the axis such that the portion of the extension member is translated from a position disposed within the base portion to a position disposed outside of the base portion.

15. The computing device of claim 10, wherein the display portion includes a display surface, the extension member is configured to translate in response to the display surface being rotated beyond a threshold angle with respect to a top surface of the base portion.

16. The computing device of claim 10, further comprising:
a switch configured to be actuated by rotational movement of the display portion; and
a movement device coupled to the switch and configured to cause the extension member to translate and rotate in response to actuation of the switch.

17. The computing device of claim 10, further comprising:
a guide within which the portion of the extension member is configured to slidably move when translated.

18. The computing device of claim 10, further comprising:
a device configured to resist translation of the portion of the extension member in response to the display portion being rotated about the axis.

19. A computing device, comprising:
a base portion including an input region;
an extension member disposed within and coupled to the base portion; and
a display portion operably coupled to the base portion via a gear mechanism, the display portion configured to rotate about an axis, the gear mechanism configured to cause the axis to translate with respect to the input region as the display portion is rotated about the axis from a first open position to a second open position such that the extension member translates out of the base portion as the display portion is rotated about the axis.

20. The computing device of claim 19, wherein the extension member is configured to cause the axis to translate away from the input region in response to a display surface of the display being rotated away from the base portion towards a flat position, the display surface being aligned along a plane substantially parallel to a plane along which a bottom surface of the base portion is aligned when the display portion is in the flat position.

21. The computing device of claim 19, wherein the gear mechanism includes a hinge portion, the display portion is configured to rotate about the axis through hinge portion.

22. The computing device of claim 19, wherein a distance between the axis and the input region increases in response to a display surface of the display portion being rotated away from the base portion, the display surface is a surface upon which illuminated objects are displayed, the distance between the axis and the input region decreases in response to the display surface of the display being rotated towards the base portion.

23. The computing device of claim 19, wherein the axis translates with respect to the input region in response to the display portion being rotated with respect to the base portion about the axis from a first position to a second position, the display portion has a display surface that faces the input region and is aligned along a plane that is substantially parallel to a plane along which the input region is aligned when the display portion is in the first position, the display surface of the display is rotated more than 160 degrees from the first position to the second position.

* * * * *